(12) United States Patent
Torihara

(10) Patent No.: US 7,267,471 B2
(45) Date of Patent: Sep. 11, 2007

(54) LIGHT GUIDE BODY, LIGHTING DEVICE, LIQUID CRYSTAL DISPLAY DEVICE, AND ELECTRONIC DEVICE

(75) Inventor: Hiroshi Torihara, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 128 days.

(21) Appl. No.: 10/941,966

(22) Filed: Sep. 16, 2004

(65) Prior Publication Data

US 2005/0063172 A1 Mar. 24, 2005

(30) Foreign Application Priority Data

Sep. 19, 2003 (JP) ............................. 2003-328426

(51) Int. Cl.
*F21V 8/00* (2006.01)
(52) U.S. Cl. ...................... 362/625; 362/561; 362/607; 362/610
(58) Field of Classification Search ................ 362/625, 362/606, 607, 608, 610, 614, 559, 560, 561, 362/511, 330, 812, 617
See application file for complete search history.

(56) References Cited

U.S. PATENT DOCUMENTS

| | | | | |
|---|---|---|---|---|
| 2,106,980 A | * | 3/1938 | Kavanaugh | .................. 451/31 |
| 4,373,282 A | * | 2/1983 | Wragg | ......................... 40/546 |
| 5,390,276 A | * | 2/1995 | Tai et al. | ..................... 385/146 |
| 5,394,308 A | | 2/1995 | Watanabe et al. | |
| 5,617,251 A | * | 4/1997 | Ohta et al. | ................... 359/599 |
| 5,886,799 A | * | 3/1999 | Molteni et al. | ............... 359/15 |
| 5,961,198 A | * | 10/1999 | Hira et al. | ................... 362/621 |
| 6,412,969 B1 | | 7/2002 | Torihara et al. | |
| 6,435,686 B1 | | 8/2002 | Gotou et al. | |
| 6,497,946 B1 | * | 12/2002 | Kretman et al. | ......... 428/317.9 |
| 6,835,440 B1 | * | 12/2004 | Konishi et al. | ............. 428/156 |
| 2002/0191387 A1 | | 12/2002 | Cha et al. | |
| 2005/0002176 A1 | | 1/2005 | Cha et al. | |

FOREIGN PATENT DOCUMENTS

| | | |
|---|---|---|
| JP | 03-214191 | 9/1991 |
| JP | 08-122537 | 5/1996 |
| JP | 2000-294024 | 10/2000 |
| JP | 2002352614 A * | 12/2002 |
| KR | 10-2001-0035196 | 5/2001 |

* cited by examiner

*Primary Examiner*—Sharon E. Payne
(74) *Attorney, Agent, or Firm*—Nixon & Vanderhye P.C.

(57) ABSTRACT

In a light guide body, a flat part is provided at an edge part of a fluorescent tube vicinal part (part that receives strong light), and a pear-skin texture pattern having a sine wave shape boundary is formed inside the flat part. Therefore, it is possible to alternately provide, along a direction to which the fluorescent tube extends, small pear-skin texture regions and small flat regions. In certain example embodiments, scattering intensity of the light guide body is set so that it becomes stronger gradually from the edge part close to the fluorescent tube toward the inside far from the fluorescent tube.

13 Claims, 9 Drawing Sheets

LIGHT GUIDE BODY, LIGHTING DEVICE, LIQUID CRYSTAL DISPLAY DEVICE, AND ELECTRONIC DEVICE

This Nonprovisional application claims priority under 35 U.S.C. § 119(a) on Patent Application No. 2003/328426 filed in Japan on Sep. 19, 2003, the entire contents of which are hereby incorporated by reference.

FIELD OF THE INVENTION

The present invention relates to a light guide body, having side and top surfaces, which causes light incident on the side surface to be emitted from the top surface.

BACKGROUND OF THE INVENTION

A liquid crystal display (LCD; liquid crystal display device), which displays images via a liquid crystal panel, has mainly two basic functions. One of them is to illuminate the liquid crystal panel from its back surface (lighting function), and the other function is to control the light to be displayed by the liquid crystal panel (display control function).

According to recent ever-increasing user needs, a casing trim of the liquid crystal panel (frame part which surrounds an image display region) needs to be narrowed down by improving the lighting function so that the light is extensively illuminated. The needs must be satisfied while securing display quality.

A document 1, which will be described later, discloses a practical technique which makes a breakthrough for narrowing the casing trim of a liquid crystal panel such as the above liquid crystal panel. FIG. 9 is an explanatory diagram (principle cross sectional diagram) showing a liquid crystal display disclosed in the document 1. As shown in FIG. 9, the liquid crystal display includes a liquid crystal panel 101, and a lighting section 102 including a fluorescent tube L for lighting (illuminating) and a light guide body 106.

In order to narrow the casing trim, in the liquid crystal display, cutouts are provided at both ends of the light guide body (transparent resin) 106 in the lighting section 102, and the fluorescent tube L is provided in the cutouts. That is, according to the liquid crystal display, part of the fluorescent tube L is provided within an effective display region (inside dotted lines V).

In addition, in this technique, in order to uniformize luminance (brightness) of the lighting, a scatterer 105, provided on top of the fluorescent tube L, is used along with the light guide body 106. The scatterer 105 is made of a resin including light scattering agent. Addition density of the scattering agent in the scattering body 105 is optimized in accordance with a haze of a diffusion sheet covering the upper part of the scatterer 105. This secures the uniformity of the luminance in the entire display region of the liquid crystal panel 101.

Note that, in the above arrangement, the light from the fluorescent tube is guided to the entire display region by the light guide body (normally a flat plate shape) provided adjacent to the fluorescent tube.

According to the light guide body, if the light, which goes into the light guide body from the fluorescent tube, has total reflection in an upper surface (a surface on a side of the liquid crystal panel side) or in a back surface, then it is not possible to uniformize the luminance. This is because the display light (i.e., the light to be displayed by the liquid crystal panel) of a reflected portion decreases. In view of the circumstances, a pear-skin texture (emboss) is formed on the upper and back surfaces of the light guide body to scatter the light.

Such a pear-skin texture is disclosed in the document 1 and a document 2 which will be described later. The document 2 discloses a technique in which a plurality of dotted-like pear-skin texture regions (pear-skin texture dots) are formed on the back surface of the light guide body. In this technique, the pear-skin texture dots are small in a part in the vicinity of the fluorescent tube (fluorescent tube vicinal part), whereas the pear-skin texture dots are large in a portion farther from the fluorescent tube. With this arrangement, light scattering quantity in the portion in the vicinity of the fluorescent tube (portion which receives a large amount of light) is less than that in the portion, farther from the fluorescent tube, which receives a small amount of light. As a result, the luminance of the display region is uniformized.

[Document 1] Japanese unexamined patent publication No. 235805/2000 (Tokukai 2000-235805, published on Aug. 29, 2000). Corresponding U.S. Pat. No. 6,412,969B1.

[Document 2] Japanese unexamined patent publication No. 313883/1994 (Tokukaihei 6-313883, published on Nov. 8, 1994). Corresponding U.S. Pat. No. 5,394,308.

However, in the case where the luminance is uniformized by changing the pear-skin texture dot size as described in the document 2, many regions having no pear-skin texture (regions between the dots) are formed on the back surface of the light guide body. As such, the absolute quantity of the light scattering cannot be increased. Here, such a problem arises that cannot increase the overall luminance.

Alternatively, it may be possible to form plural kinds of the pear-skin texture regions, whose densities (degree of scattering) are different from each other, on the entire back surface of the light guide body. However, it is technically difficult to form extremely low-density pear-skin texture. Therefore, in this case, it is impossible to sufficiently reduce the light scattering quantity. This gives rise to the excessively increase of the luminance of this portion, thereby resulting in that it is impossible to uniformize the luminance.

SUMMARY OF THE INVENTION

The present invention was made in view of the foregoing conventional problems. An object of the present invention is to provide a light guide body which appropriately adjusts the luminance in a fluorescent tube vicinal part so as to realize the uniformity of the luminance in the display region.

To achieve this object, a first light guide body of the present invention is a light guide body, including a side surface, a top surface, and a back surface, which causes a pear-skin texture region to scatter light incident on the side surface from a linear light source so that the light thus scattered is emitted from the top surface, wherein a flat region having no pear-skin texture is formed on an edge part of the back surface along the linear light source, the pear-skin texture region is formed inside the flat region, and a boundary between the flat region and the pear-skin texture region has a wave shape.

The first light guide body converts the light from the linear light source into planar light (flat light; light from a part having a predetermined width), and emits the light thus converted to the outside. The first light guide body can be suitably applied to electronic devices utilizing a lighting device which emits the planar light, such as a liquid crystal display device (LCD), an interior illumination, a signboard, an X-ray machine, or the like.

As mentioned above, the pear-skin texture region for scattering the light is formed on the back surface of the first light guide body. The light which is emitted from the linear light source and enters into the side surface is scattered by the pear-skin texture region on the back surface. The light thus scattered is emitted from the top surface facing the back surface.

Especially, the flat region having no pear-skin texture is formed on an edge part of the back surface along the linear light source.

That is, the quantity of the light incident on the back surface decreases gradually from a portion close to the linear light source toward a portion far from the linear light source. As such, the back surface of the edge part close to the linear light source receives extremely strong incident light (flash back light).

In view of the circumstances, the first light guide body includes the flat region at the above edge part, so that the light scattering quantity is suppressed and the luminance at the edge part is reduced.

Moreover, the pear-skin texture region is formed inside the flat region (an inner side of the flat region of the light guide body; on a side far from the linear light source) on the back surface of the first light guide body.

That is, in the first light guide body, the pear-skin texture fully scatters the incident light in the part (region) far from the linear light source. As such, it is possible to increase the quantity of the light which is emitted from the top surface. This allows the increase in the entire luminance.

Moreover, in the first light guide body, the flat region is formed along the linear light source. As such, the boundary (pear-skin texture boundary) between the flat region and the pear-skin texture region also extends along the linear light source.

Especially, in the first light guide body, the pear-skin texture boundary extending along the linear light source has a wave profile (wave shape). Here, the wave profile means a row of concavity and convexity or ups and downs, such as a sine wave shape, a triangular wave shape, a rectangular wave shape, or the like.

Therefore, in the first light guide body, it is possible to alternately provide, along the direction to which the linear light source extends, small pear-skin texture regions (pear-skin texture small regions) and small flat regions (flat small regions) via the pear-skin texture boundary.

With the arrangement, the high-luminance light (bright line) corresponding to the pear-skin texture small regions and the low-luminance light (dark line) corresponding to the flat small regions are alternately emitted, along the direction to which the linear light source extends, from the top surface above the pear-skin texture region in the first light guide body.

Therefore, when an optical film (light diffusion sheet or the like) having a function of shuffling of the light is provided on the top surface of the first light guide body, it is possible to emit the light having an intermediate luminance, which is brighter than the low-luminance line and darker than the high-luminance line, from the pear-skin texture boundary.

As described above, on the back surface of the first light guide body, the substantial scattering intensity on the pear-skin texture boundary can be set to be stronger than that on the flat region and weaker than that on the pear-skin texture region. That is, the scattering intensity of the back surface of the first light guide body is set so that it becomes stronger gradually from the edge part close to the linear light source toward the inside far from the linear light source.

Moreover, as described above, the quantity of the light incident on the back surface of the first light guide body decreases gradually from the edge part toward the inside.

Therefore, it is possible to uniformize the light scattering quantity on each region of the back surface of the first light guide body. This allows the luminance of the light, which is emitted from the top surface of the first light guide body, to be wholly unformized.

Note that, the pear-skin texture region inside the flat region is not limited to a specific one, provided that it is formed so that the boundary between the pear-skin texture region and the flat region has a wave profile. As such, in order to increase the luminance, it is preferable to form the pear-skin texture region on the entire surface inside the flat region. Moreover, another flat regions may be formed in part of the pear-skin texture region which is formed inside the flat region, to an extent that decrease of the luminance does not occur. That is, the pear-skin texture region may be formed on the substantially entire surface inside the flat region.

Moreover, in the case where the light (flash back light) incident on the edge part close to the light source is not so strong, it is preferable that the flat region be very small (narrow).

In this case, the scattering intensity at the edge part in the vicinity of the linear light source is substantially equal to the scattering intensity of the pear-skin texture boundary.

Additional objects, features, and strengths of the present invention will be made clear by the description below. Further, the advantages of the present invention will be evident from the following explanation in reference to the drawings.

DESCRIPTION OF THE EMBODIMENTS

The following description deals with one embodiment of the present invention.

A liquid crystal display of the present embodiment (present LCD) is a liquid crystal display device which is used as an in-vehicle LCD for a car navigation system.

Figure 2:
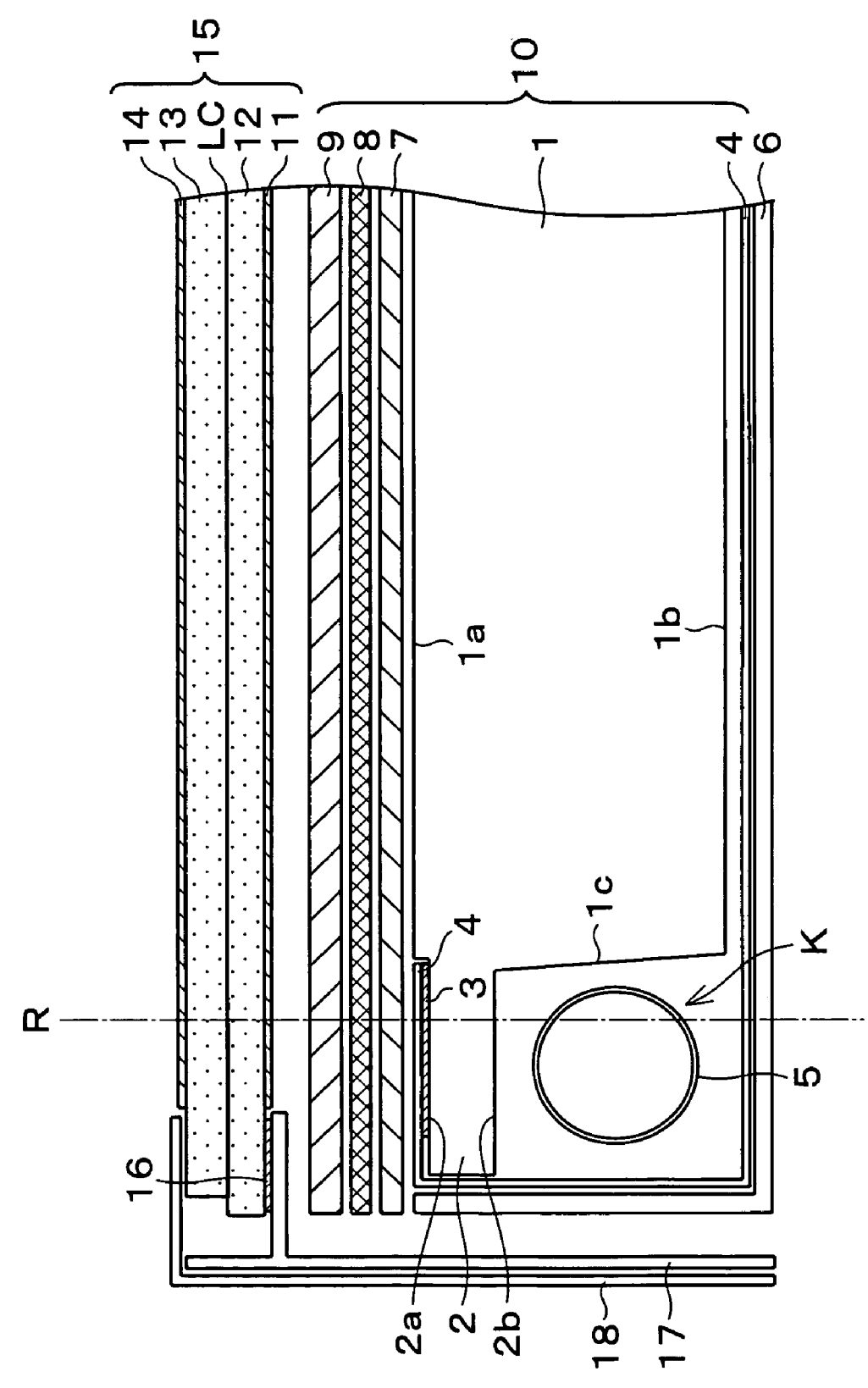
FIG. 2 is an explanatory diagram showing a structure of the liquid crystal display device having the light guide body shown in FIG. 1.

FIG. 2 is an explanatory diagram showing a structure of the present LCD.

As shown in FIG. 2, the present LCD is arranged so that a lighting section 10 and a liquid crystal panel 15 are supported by a metal bezel 18, a plastic case 17, and a back hardware case 6.

An inside a dotted line R (right side in FIG. 2) is an effective display region for displaying images.

The metal bezel 18 serves as a case forming an outer shape of the present LCD, protects the present LCD, and supports internal constituents.

The lighting section 10 and the liquid crystal panel 15 are combined with each other via a double-faced adhesive tape 16.

The liquid crystal panel 15 includes a lower polarization plate 11, a lower glass 12, a liquid crystal layer LC, an upper glass 13, and an upper polarization plate 14, which are stacked in this order and are respectively supported by the metal bezel 18 and the plastic case 17.

An alignment state of the liquid crystal layer LC is changed by controlling display circuits (not shown), each circuit including gate wirings, source wirings, TFTs and the like, on the respective upper and lower glasses. This controlling allows the liquid crystal panel 15 to perform a target display.

The lighting section 10 is provided for uniformly illuminating the light with respect to the effective display region of the liquid crystal panel 15.

As shown in FIG. 2, the lighting section 10 is arranged to include a fluorescent tube 5, a light guide body 1, a reflection sheet 4, a diffusion sheet 7, a prism sheet 8, and a selective polarization reflection film 9.

Moreover, as shown in FIG. 2, the reflection sheet 4, the light guide body 1, the diffusion sheet 7, the prism sheet 8, and the selective polarization reflection film 9 are stacked in this order at the center portion of the lighting section 10.

As will be described later, the fluorescent tube 5 is a U-shaped cold cathode tube provided along one long side and along two short sides of the rectangular light guide body 1. The fluorescent tube 5 serves as a linear light source for generating the light to illuminate the liquid crystal panel 15.

The light guide body 1 is a rectangular and flat plate, and is made by an injection molding of a transparent acrylic (transparent resin). The light from the fluorescent tube 5 is scattered by a pear-skin texture pattern formed on a back surface (farther surface from the liquid crystal panel 15) 1b of the light guide body 1. This allows the entire effective display region of the present LCD to be uniformly illuminated.

That is, the light guide body 1 converts the light from a linear light source such as the fluorescent tube 5 into planar light (light illuminated from a portion having a predetermined width), so as to illuminate the light thus converted to the outside.

Note that, the pear-skin texture patterns of the light guide body 1 will be described later.

Moreover, as shown in FIG. 2, around the end part, where the fluorescent tube 5 is provided, of the light guide body 1, the under part of the light guide body 1 is hollowed out while leaving the cutout 2 at the top of the light guide body 1. The fluorescent tube 5 is provided in a container section K corresponding to a region (in the cutout 2) hollowed out in the light guide body 1.

Furthermore, the reflection sheet 4 is adhered to an upper surface 2a of the cutout 2 via a double-faced adhesive tape 3.

An optical film is made up of the diffusion sheet 7, the prism sheet 8, and the selective polarization reflection film 9, which are provided on an front surface (lighting side surface; a surface on a side of the liquid crystal panel 15) 1a. The optical film is provided for adjusting a diffusion state and/or a polarization state of the light from the light guide body 1.

Note that, above the upper face 2a of the cutout 2 of the light guide body 1, the optical film is provided above the reflection sheet 4.

The reflection sheet 4 is provided mainly for preventing direct light from the fluorescent tube 5 from passing through the cutout 2 and reaching the side of the liquid crystal panel 15.

Note that, each member of the lighting section 10 is fixed in position by the plastic case 17 and the back hardware case 6.

The following description deals with the pear-skin texture patterns formed on the back surface 1b of the light guide body 1. The pear-skin texture patterns are one of characteristic structures of the present invention.

The pear-skin texture patterns are provided for scattering the light from the fluorescent tube 5. The pear-skin texture patterns are formed when the light guide body 1 is formed by the injection molding.

Figure 1:
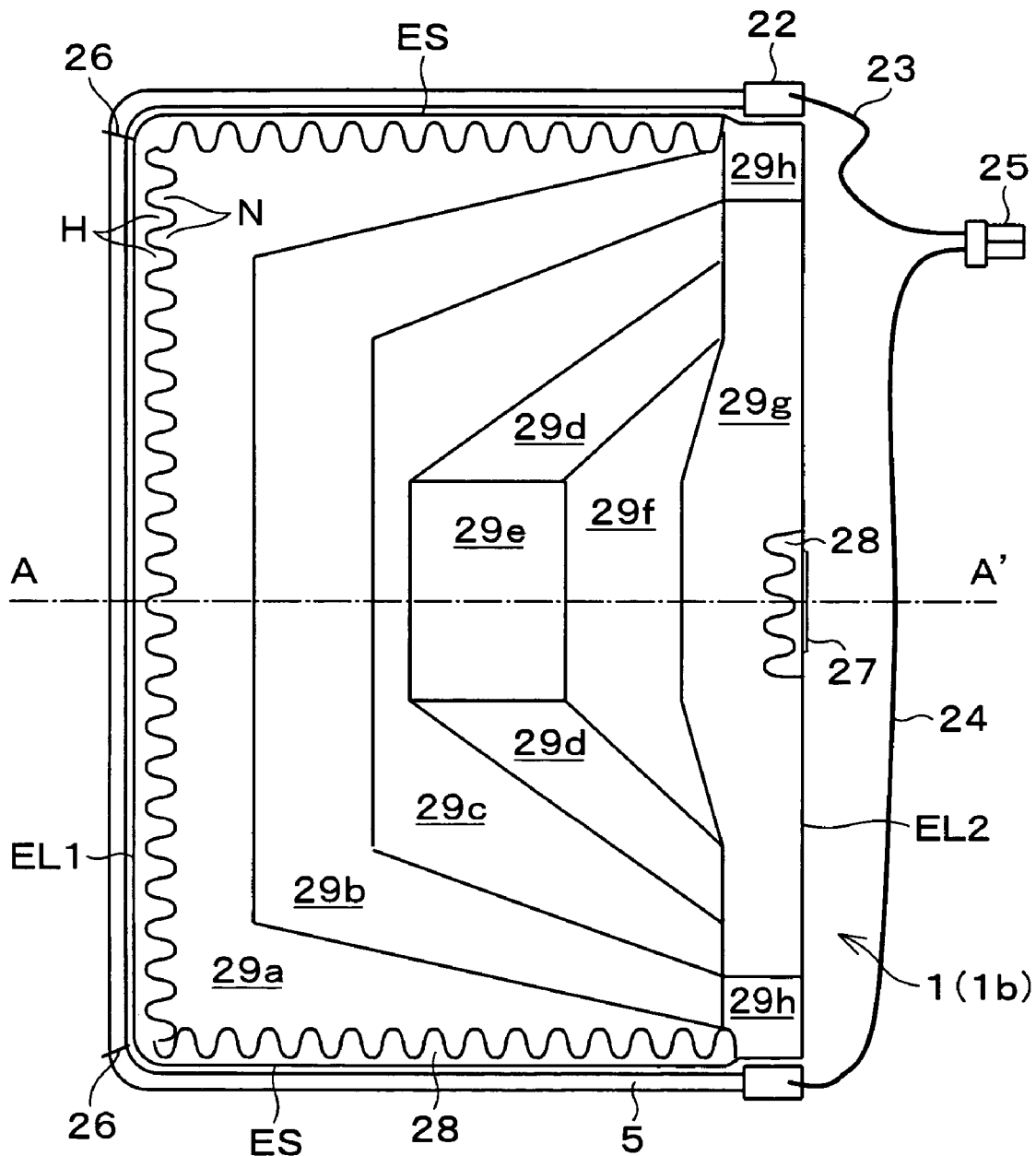
FIG. 1 is an explanatory diagram showing a structure of a light guide body provided in a liquid crystal display device in accordance with one embodiment of the present invention.

FIG. 1 is an explanatory diagram showing in detail the back surface 1b, on which the pear-skin texture patterns are formed, of the light guide body 1. FIG. 1 is an explanatory diagram obtained when viewing the present LCD from its back surface side.

As shown in FIG. 1, the fluorescent tube 5, shown in FIG. 2, is provided around the back surface 1b. The fluorescent tube 5 is a U-shaped tube, which surrounds three sides (one long side EL1 and two short sides ES) of the light guide body 1. The fluorescent tube 5 is fixed to the light guide body 1 by two lamp rings 26.

Moreover, a harness wire 23 on a hot side and a harness wire 24 on a low-voltage side are connected to the fluorescent tube 5 via respective rubber holders 22. Further, these harness wires 23 and 24 are respectively attached to a connector 25 for receiving external electric power.

In addition, a gate opening trace 27, which is made when the light guide body 1 is produced, remains at a center part of a long side EL2 (a long side along which the fluorescent tube 5 is not provided), in the vicinity of the rubber holder 22, of the light guide body 1.

Moreover, the pear-skin texture patterns 29a through 29h are formed on the back surface 1b of the light guide body 1. Here, the pear-skin texture patterns 29a through 29h are plural kinds of patterns whose scattering intensities (light scattering abilities) are different from each other. These patterns have preferable shapes and are provided at preferable positions, in order to uniformize the luminance of the present LCD, respectively.

The pear-skin texture of the pear-skin texture pattern 29a, which is formed in the vicinity of three sides of the back surface 1b along the fluorescent tube 5, has the lowest scattering ability out of the pear-skin texture patterns 29*a* through 29*h*. This is to extremely suppress scattering the light from the fluorescent tube 5 in a region where the pear-skin texture pattern 29*a* is formed (such a region is used for illuminating the region where the pear-skin texture pattern 29*a* is formed), so that the light is guided to the internal part of the light guide body 1.

Moreover, the scattering abilities of the pear-skin textures in the other pear-skin texture patterns 29*b* through 29*h* are respectively set so that the farther from the fluorescent tube 5 the pear-skin texture patterns are provided, the stronger the scattering abilities become.

The pear-skin texture pattern 29*a* is formed along one long side EL1 and along two short sides ES of the light guide body 1. That is, the pear-skin texture pattern 29*a* is formed along the fluorescent tube 5.

Especially, a boundary (a boundary along a direction in which the fluorescent tube 5 extends) on an outer side (on a side where a side of the back surface 1*b* is provided) of the pear-skin texture pattern 29*a* has a sine wave shape.

Therefore, a flat part 28, which has a boundary of a sine wave shape and has no pear-skin texture, is formed on the outer side (that is, an endmost part of the back surface 1*b*).

Moreover, the sine wave shape of the boundary, provided in a direction parallel to the long side EL1 of the light guide body 1, between the pear-skin texture pattern 29*a* and the flat part 28 is different from that of the boundary, provided in a direction parallel to the short side ES of the light guide body 1, between the pear-skin texture pattern 29*a* and the flat part 28.

That is, the sine wave shape of the boundary extending along the long side EL1 is 2 mm in amplitude (wave shape amplitude) and 2 mm in pitches (cycle). Moreover, average (average line) of amplitude from the edge of the light guide body 1 is 1.5 mm.

On the other hand, the sine wave shape of the boundary extending along the short side ES is 1.5 mm in amplitude, and 1.5 mm in pitch. Moreover, average (average line) of amplitude from the edge of the light guide body 1 is 0.8 mm.

Moreover, the fluorescent tube 5 is not provided at a part (an edge part in the vicinity of the long side EL2) corresponding to the rubber holder 22 on the short side ES. As such, no pear-skin texture pattern 29*a* and no flat part 28 are formed in such a part. Instead, the pear-skin texture pattern 29*h* having a predetermined scattering intensity is formed up to an edge of the light guide body 1.

The following description deals with production of a metallic mold for forming the light guide body 1 including the flat part 28 and the pear-skin texture pattern 29*a*.

First, a protective film having a shape of the flat part 28 (having a pear-skin texture boundary) is attached to a part (a region), where the flat part 28 is formed, which is inside a basic metallic mold for forming the light guide body 1 by the injection molding (inside a basic metallic mold to which acrylic is inpoured). PET (polyethylene terephthalate), whose one side is subject to adhesive processing and whose thickness is 188 μm, can be used as such a protective film.

Next, the inside of the basic metallic mold is sprayed with various kinds of sand blasts respectively corresponding to the pear-skin texture patterns 29*a* to 29*h* (sand blast step).

Next, after the protective film is removed, the metallic mold is washed. Here, because a part where the flat part 28 is formed is protected by the protective film, such a part has no sand blast and is flat. In this way, it is possible to obtain the present metallic mold which can form the light guide body 1 including the flat part 28 and the pear-skin texture patterns 29*a* through 29*h*.

Note that, the sine wave shape of the protective film can be made by using a cutting machine for industrial design which is controlled by a computer.

The following description deals with functions and effects of the sine wave shape boundary between the flat part 28 and the pear-skin texture pattern 29*a*.

Extremely strong light from the fluorescent tube 5 enters into a part (region) in the vicinity of the fluorescent tube 5 in the light guide body 1. Such a part indicates a fluorescent tube vicinal part (region).

Therefore, if the light is strongly scattered in the fluorescent tube vicinal part, then the luminance of display light corresponding to the fluorescent tube vicinal part (display light emitted from a corresponding part of the liquid crystal panel 15 being located above the fluorescent tube vicinal part) becomes markedly strong. In contrast, because the other parts of the light guide body 1 cannot adequately receive the light, the other parts have inadequate luminance, accordingly. That is, it becomes impossible to obtain uniform luminance.

On the other hand, if the pear-skin texture is not formed at all in the fluorescent tube vicinal part, the light incident on the fluorescent tube vicinal part is not scattered, thereby causing substantial total reflection. As such, the light ultimately is directed to the inside the light guide body 1. Therefore, the fluorescent tube vicinal part will have inadequate luminance.

In view of the circumstances, according to the present LCD, as shown in FIG. 1, by providing the fluorescent tube vicinal part with the pear-skin texture pattern 29*a* having the sine wave shape boundary, pear-skin texture small regions N and flat small regions H are alternately provided in the direction to which the fluorescent tube 5 extends.

As a result, with respect to the fluorescent tube vicinal part of the light guide body 1, high-luminance light (bright line) and low-luminance light (dark line) are alternately illuminated in the direction to which the fluorescent tube 5 extends.

These two kinds of light are shuffled with each other by the optical film including the diffusion sheet 7, the prism sheet 8, and the selective polarization reflection film 9. Then, the two kinds of light illuminates the liquid crystal panel 15.

This allows the luminance of the light which is emitted from the fluorescent tube vicinal part to the liquid crystal panel 15 to be set to an appropriate value (a value similar to the values of the other parts).

More specifically, on the back surface 1*b* of the light guide body 1, the substantial scattering intensity on the pear-skin texture boundary is set to be stronger than that on the flat part 28 and weaker than that on the pear-skin texture pattern 29*a*. That is, in the light guide body 1, it is possible to set the scattering intensity of the back surface 1*b* so that it becomes gradually stronger from the edge part close to the fluorescent tube 5 toward the inside far from the fluorescent tube 5. The quantity of the light incident on the back surface 1*b* becomes less from the edge part toward the internal side.

Therefore, it is possible for the light guide body 1 to uniformize the light scattering quantity of each region of the back surface 1*b*. As a result, the light guide body 1 can uniformize the luminance of the light emitted from the surface over the entire surface of the light guide body.

Moreover, as described above, the present metallic mold for obtaining the light guide body 1 is formed by attaching the protective sheet to the basic metallic mold (the metallic mold that has not been subject to the spraying of sand blast).

Therefore, as compared with the method for obtaining the present metallic mold by spraying sand blast while avoiding a region corresponding to the flat small region H of the basic metallic mold, it is possible to easily form the pear-skin texture boundary which causes the pear-skin texture small regions N and the flat small regions H to be alternately provided with respect to the fluorescent tube vicinal part of the light guide body 1.

Note that, as shown in FIG. 1, in the present LCD, the flat part 28 is formed with respect to the adjacent region of the gate opening trace 27. Moreover, the boundary between the pear-skin texture pattern 29g and the flat part 28 has the sine wave shape. The reason for this is explained below.

It is possible to form the light guide body 1 by carrying out the injection molding of an acrylic, with the use of the above-mentioned present metallic mold. Note that, metallic molds including the present metallic mold is generally provided with a gate opening in which an acrylic is poured. The light guide body 1, which has been just subject to the injection molding, has a projection corresponding to the gate opening.

The projection is removed after the light guide body 1 is taken off from the present metallic mold and before the light guide body 1 is applied to the lighting section 10 of the present LCD. In the light guide body 1, a small trace (distortion) which occurs during the removing of the projection is left in the from of a gate opening trace 27. The gate opening trace 27 acts to increase the scattering of the light.

In view of the circumstances, the present LCD avoids excessive scattering by forming the flat part 28 in the vicinity of the gate opening trace 27 of the back surface 1b of the light guide body 1.

With the above-mentioned method using the protective film, it is possible to pattern the metallic mold so that the metallic mold has a shape of the flat part 28 in the vicinity of the gate opening trace 27. As such, the affect of the gate opening trace 27 (effect on the uniformity) can be suppressed without newly processing the gate opening trace 27 after the injection molding.

Next, a structure in the vicinity of the cutout 2 of the light guide body 1 shown in FIG. 2 is explained below in detail.

Figure 3:
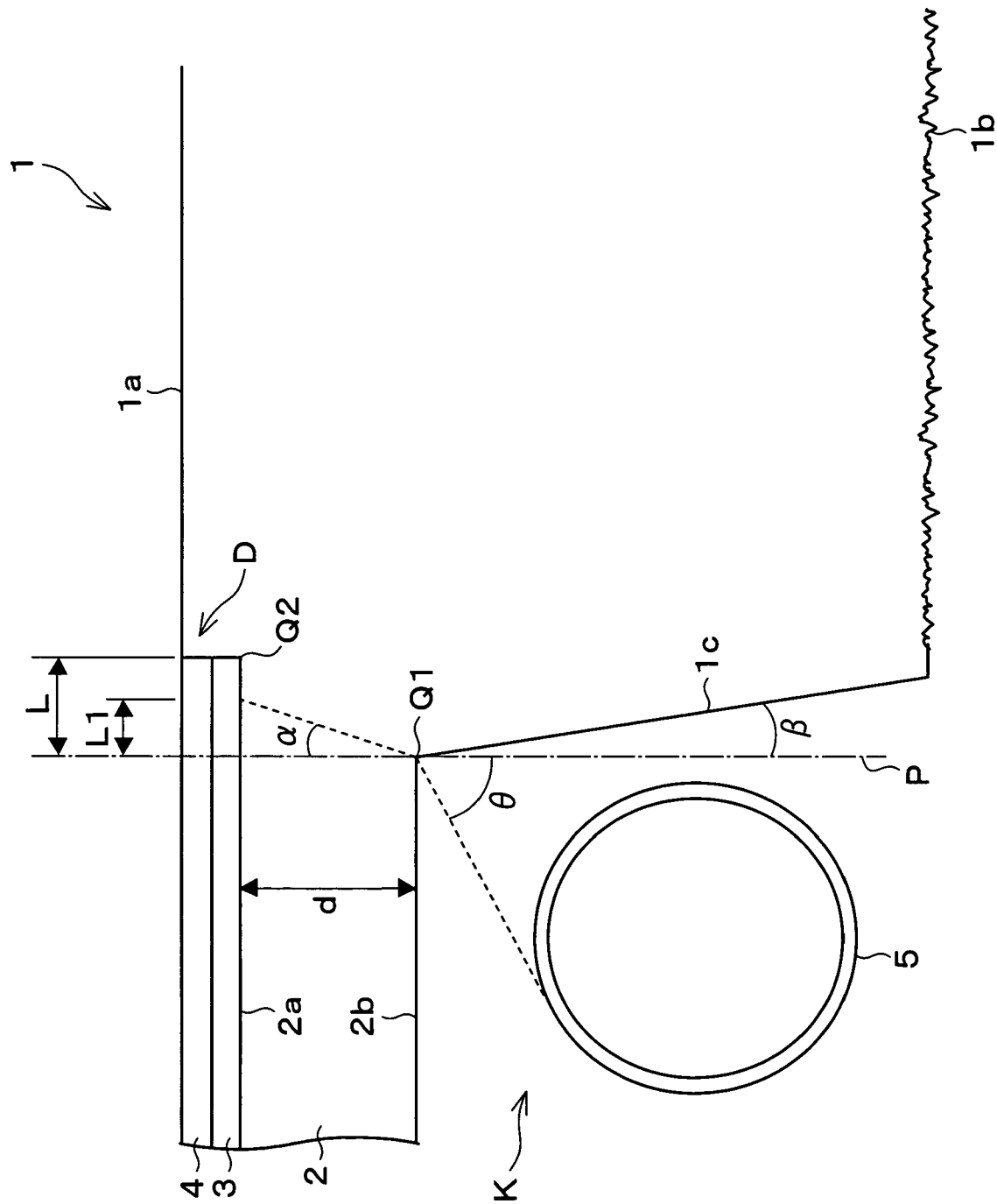
FIG. 3 is an explanatory diagram showing an enlarged vicinity of a cutout of the light guide body in the liquid crystal display device shown in FIG. 2.

FIG. 3 is an explanatory diagram showing an enlarged vicinity of the cutout 2 of the light guide body 1, the light guide body 1 being formed bridging thee sides, and including the fluorescent tube 5 of the present LCD.

As shown in FIG. 3, the container section K for containing the fluorescent tube 5 is provided under a lower surface 2b of the cutout 2.

Moreover, a digging section D is formed above the upper surface 2a of the cutout 2 in order to place the reflection sheet 4. The reflection sheet 4 is provided for avoiding that the light incident on the double-faced adhesive tape 3 and on the cutout 2 passes through and reaches the liquid crystal panel 15.

Note that, because of the digging section D, the upper surface 2a of the cutout 2 is lower than the surface (the surface on the side of the liquid crystal panel 15) 1a of the light guide body 1. Moreover, the difference (depth of the digging section D) between the upper surface 2a and the surface 1a is set to such a value that causes the surface of the reflection sheet 4 to be in the same plane as the surface 1a when the double-faced adhesive tape 3 and the reflection sheet 4 are mounted on the digging section D.

Moreover, in the cutout 2, an edge part Q1 (contact point between the lower surface 2b and a wall surface 1c) is protruded, by an interval L, outwards (edge side of the light guide body 1) from an edge part Q2. The edge part Q1 is inside the lower surface 2b, and the edge part Q2 is inside the digging section D.

The wall surface 1c of the inside of the container section K (on a side where the fluorescent tube 5 is not provided), tilts to make an angle β (>0) with respect to a perpendicular line P which passes the edge part Q1 and penetrates the light guide body 1. That is, the wall surface 1c contacts with the lower surface 2b of the cutout 2 at the edge part Q1 so that the wall surface 1c is at an angle of 90°+β (angle measured from a side of the container section K) to the lower surface 2b.

Here, a preferable value of the interval L is explained.

As shown in FIG. 3, in actual, the angle θ (limit incident angle; substantial limit incident angle) of the incident light from the fluorescent tube 5 to the edge part Q1 is substantially 45° to 60°. The light incident on the edge part Q1 proceeds inside the cutout 2 with a refraction angle a.

Moreover, in order to obtain the luminance uniformity in the present LCD, it is preferable that the light incident on the edge part Q1 (i) reach the upper surface 2a of the cutout 2, (ii) be directed within the range of the interval L, and (iii) be reflected or scattered by the reflection sheet 4.

This is because the arrangement can prevent the light of the fluorescent tube 5 from emitting directly to the liquid crystal panel 15, without being scattered by the back surface 1b of the light guide tube 1 in the fluorescent tube vicinal part. Such direct light causes the fluorescent tube vicinal part to have excessive luminance increase, and it becomes impossible to keep the luminance uniformity of the present LCD (light guide body 1).

That is, when it is assumed that an interval between (i) an intersection point of the perpendicular line P and the upper surface 2a and (ii) an arrival point of the light on the upper face 2a is indicated by L1, it is preferable that the following relation is satisfied.

$$L1 < L$$

Note that L1 can be obtained by an equation (1) shown below.

$$L1 = d \times \tan\{\sin^{-1}(1/np \times \sin\theta)\} \qquad (1),$$

where d indicates a thickness of the cutout 2 (thickness of the transparent acrylic), and np indicates an refraction index of acrylic which is a material of the cutout 2 (light guide body 1).

For example, it is assumed that d is 0.85 mm and np is 1.5. On this assumption, L1 becomes 0.45, when the limit incident angle θ is 45°. Moreover, L1 becomes 0.60 mm, when the limit incident angle θ is 60°.

Because of this, it is preferable that L be larger than L1 obtained by using the equation (1). Further, when d is 0.85 mm and np is 1.5, it is preferable to satisfy 0.4 mm<L.

That is, when 0.4 mm<L is satisfied, it is possible to suppress an increase of the luminance in the fluorescent tube vicinal part. Therefore, it is possible to realize good luminance uniformity.

Note that, as shown in the equation (1), the interval L1 varies depending on (i) the change in the limit incident angles θ due to the change in the arrangement positions of the fluorescent tube 5, (ii) the thickness d of the cutout 2, or (iii) the refraction index np of the cutout 2 (acrylic).

Therefore, it is preferable that the interval L be suitably set in consideration of these physical values with the use of the equation (1).

The reflection sheet 4 shown in FIG. 3 is a foamed PET (E60L produced by Toray industries, Inc.) whose thickness is 188 μm. Since the reflection sheet 4 is the foamed PET, it is possible to moderately scatter and reflect the incident light. This permits of creating an ideal optical condition (luminance uniformity of the light guide body 1).

The following description deals with the double-faced adhesive tape 3.

The double-faced adhesive tape 3 is provided for fixing the reflection sheet 4 onto the upper surface 2a (acrylic) of the cutout 2. The double-faced adhesive tape 3 is a tape, which uses an acrylic pressure sensitive adhesive material.

Moreover, the double-faced adhesive tape 3 receives ultraviolet rays emitted from the fluorescent tube 5. This causes ultraviolet resistant material to be selected as the acrylic pressure sensitive adhesive material. The acrylic pressure sensitive adhesive material having the ultraviolet resistant property is applied to both surfaces of the double-faced adhesive tape 3.

The acrylic pressure sensitive adhesive material, having the ultraviolet resistant property, which is used for the double-faced adhesive tape 3, is obtained by adding ultraviolet absorbent (benzotriazole, triazine, or benzophenone) to an ordinary acrylic adhesive material so that the acrylic adhesive material has about 5 wt. %.

Moreover, the ultraviolet absorbent is kneaded, and is mixed with a base material (PET film) of the double-faced adhesive tape 3, so that the double-faced adhesive tape 3 is realized.

Moreover, hindered amine, which neutralizes a radical generated by heat or light, is added to the ultraviolet absorbent in the double-faced adhesive tape 3. Therefore, it is possible to suppress a decrease in adhesive power and a decrease in holding power, which are caused by heat or light of the fluorescent tube 5.

As such, even if the present LCD is used under an extremely hard condition such as in-vehicle usage, it is possible to prevent the decrease in the adhesive power and the holding power of the double-faced adhesive tape 3.

Therefore, the ideal optical condition (luminance uniformity) of the present LCD can be maintained for a long period of time. Note that, in the double-faced adhesive tape 3, the adhesive material is thicker on one surface which is fixed later (which is adhered to the cutout 2). This is made in light of an initial tackiness, thereby adequately anchoring to the cutout 2 (acrylic).

As described above, in the present LCD, the reflection sheet 4 is used for preventing the light incident on the cutout 2 from passing through toward the side of the liquid crystal panel 15. To fix the reflection sheet 4 onto the cutout 2, the double-faced adhesive tape 3 to which a measure for the ultraviolet rays is taken is used.

Conventionally, in order to prevent the light from passing through the cutout 2, a white polycarbonate resin (white polycarbonate; light scattering agent added PC), to which the light scattering agent is added, or the like is adhered to the vicinity of the edge of the light guide body 1. However, there are problems that the white polycarbonate is expensive, it easily changes into yellow across the ages, and this yellowing causes the display quality to deteriorate.

Figure 4:
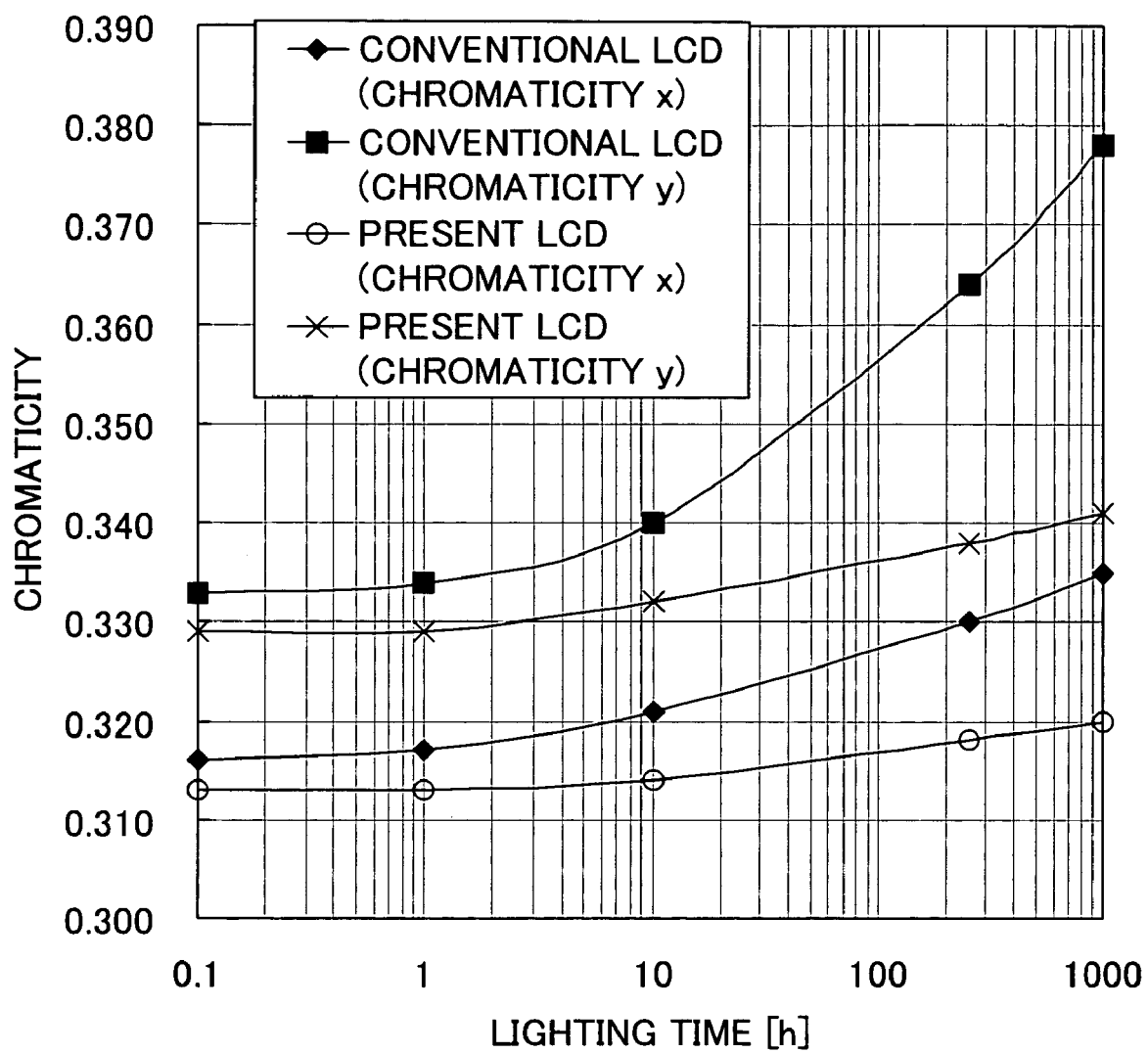
FIG. 4 is a graph showing a result obtained by measuring hourly change in chromaticity at a fluorescent tube vicinal part (edge part) of the liquid crystal display device shown in FIG. 2, and a result obtained by measuring hourly change in chromaticity at a fluorescent tube vicinal part of a conventional liquid crystal display device using white polycarbonate.

FIG. 4 is a graph showing a result obtained by measuring hourly change in chromaticity at a fluorescent tube vicinal part (edge part) of the present LCD, and a result obtained by measuring hourly change in chromaticity at a fluorescent tube vicinal part of a conventional LCD using white polycarbonate.

This measurement was done under an temperature (environmental temperature plus 60° C.) and humidity of 95%, which was in conformity to conditions of in-vehicle usage. Moreover, these LCDs were continuously lighted for 1,000 hours.

This graph shows that white polycarbonate of the conventional LCD gradually changes into yellow, both chromaticity x and chromaticity y increase, and the display quality deteriorates.

In contrast, FIG. 4 shows that, in the present LCD using the double-faced adhesive tape 3 to which the measure for the ultraviolet rays is taken, hourly change in both chromaticity x and chromaticity y scarcely occurs, and it is possible to maintain good display quality.

Note that, if the kneading and mixing and/or the coating of the ultraviolet absorbent is carried out with respect to the reflection sheet 4 of the present LCD, then it is possible to realize an LCD whose chromaticity do not change for much longer period of time. Note that FIG. 4 shows some slight change in chromaticity in the present LCD. However, it should be noted that this is caused by the change in chromaticity of the fluorescent tube 5 itself.

The following description deals with the wall surface 1c of the container section K.

As shown in FIG. 3, in the light guide body 1 of the present LCD, the wall surface 1c contacts with the lower surface 2b of the cutout 2 at the edge part Q1 so that the wall surface 1c is at an angle of $90°+\beta$ ($0<\beta$) to the lower surface 2b (angle measured from a side of the container section K). With this arrangement, in the light guide body 1 of the present LCD, a traveling path of the light from the fluorescent tube 5 is changed.

Figure 5:
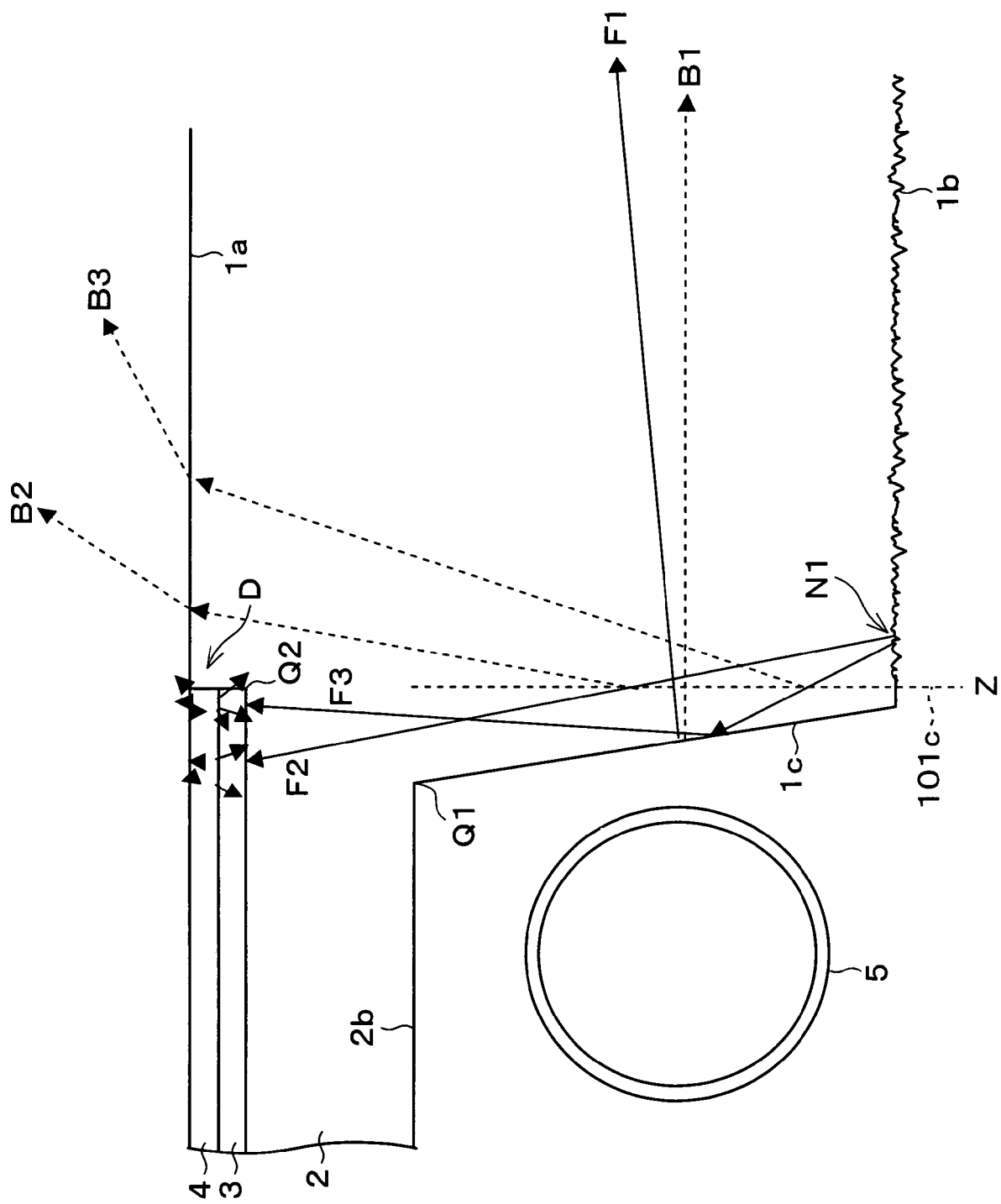
FIG. 5 is an explanatory diagram showing a path of incoming light from the fluorescent tube, in the light guide body shown in FIG. 1.

FIG. 5 is an explanatory diagram showing the path of the light which goes from the fluorescent tube 5 into the light guide body 1.

In FIG. 5, a dotted line Z shows a wall surface 101c on a side of the light guide body 1 of the container section K in the conventional LCD.

As shown in FIG. 5, conventionally, the wall surface 101c extends perpendicularly from the back surface 1b of the light guide body 1 so as to be orthogonal to the lower surface 2b of the cutout 2. Moreover, the lower surface 2b is parallel to the surface 1a and the back surface 1b, in the light guide body 1.

Moreover, out of directions of the light proceeding from the fluorescent tube 5 to the wall surface 1c, a main line direction (a direction in which the light quantity is the largest), in which the largest light quantity is obtained, is parallel to the back surface 1b (the surface 1a) of the light guide body 1.

As such, conventionally, the light which was directed in the main line direction was not refracted by the wall surface 1c as shown by a dotted line B1 in FIG. 5. As a result, the main line direction of the light in the light guide body 1 was parallel to the back surface 1b (the surface 1a).

This caused the light which was directed in the main line direction not to act on the back surface 1b and the surface 1a. As a result, it was difficult to use the light proceeding in the main line direction as the display light.

In contrast, as shown in FIG. 5, in the light guide body 1 of the present LCD, the wall surface 1c tilts as described above. As such, the incident light proceeding in the main line direction from the fluorescent tube 5 is refracted by the wall 1c. This allows the main line direction in the light guide body 1 to point toward the surface 1a of the light guide body 1 (see a solid line F1 in FIG. 5).

Therefore, in the light guide body 1 of the present LCD, it is easy to use, as the display light, the light which is directed in the main line direction. Accordingly, it is easy to increase the luminance of the present LCD (especially, the luminance of the center portion). Moreover, since the refraction angle is small, the display light which is directed in the main line direction reaches a portion which is in the light guide body 1 and is far from the fluorescent tube 5. As a result, it is possible to improve the luminance uniformity of the entire display region.

Moreover, as shown in FIG. 5, conventionally, the interval L is 0, and the edge part (edge part Q1 of the present LCD) inside the lower surface 2b of the cutout 2 and the edge part (edge part Q2 of the present LCD) inside the upper surface 2a are located at the same position in a lateral direction (a direction to which the surface 1a extends). As such, the perpendicular wall surface 101c was provided at a position where the wall surface 101c passes through the edge part inside the upper surface 2a (edge part Q2).

Therefore, conventionally, the light scattered by a pear-skin texture region N1 in the fluorescent adjacent region on the back surface 1b is partially reflected by the perpendicular wall surface 10c, and passes through the surface 1a (see dotted lines B2 and B3). The light thus passed through becomes the display light of the fluorescent tube vicinal part.

As such, the fluorescent tube vicinal part has excessively high luminance.

On the other hand, as shown in FIG. 5, in the light guide body 1 of the present LCD, the edge part Q1 is located outside, by the interval L, from the edge part Q2. The edge part Q1 contacts with the wall surface 1c at the angle of (90°+β).

Therefore, part of the light scattered by the pear-skin texture region N1 is reflected by the wall surface 1c, enters into the cutout 2 (see solid lines F2 and F3), and is moderately scattered and reflected by the reflection sheet 4, so as to return to the light guide body 1 (including the cutout 2). As a result, it is possible to avoid that the fluorescent tube vicinal part has an increase in the luminance.

As described above, in the light guide body 1 of the present LCD, the tilting of the wall surface 1c can suppress the excessive increase of the luminance at the fluorescent tube vicinal part, thereby improving the luminance uniformity.

In the light guide body 1, even if physical stress exerted toward the inside of the light guide body 1 is applied to the fluorescent tube 5, the fluorescent tube 5 can slide along the tilted wall surface 1c. As such, it is possible to let the stress slip. As a result, it is possible to avoid that the fluorescent tube 5 breaks down due to the stress.

Figure 6:
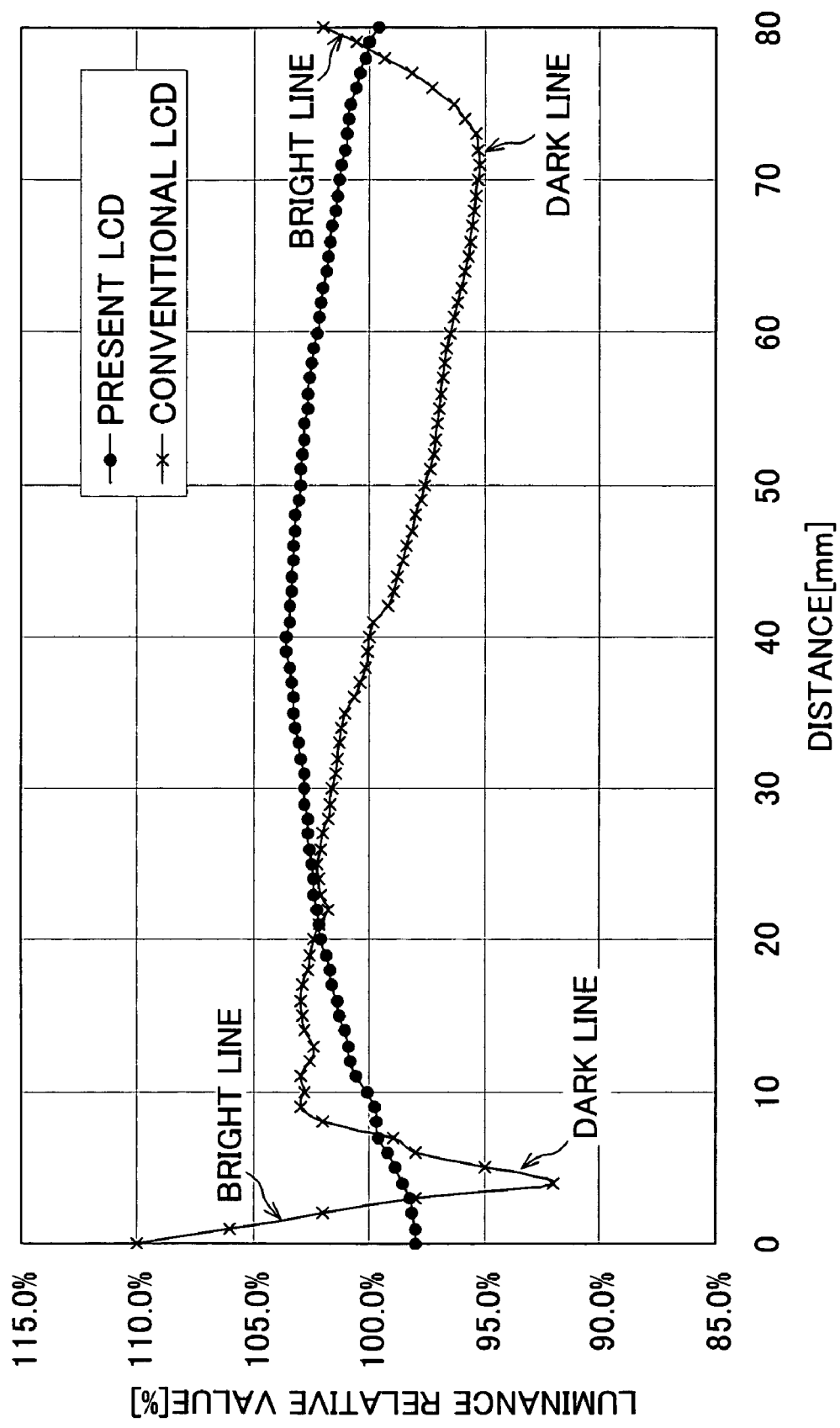
FIG. 6 is a graph showing results obtained by measuring respective luminance distributions of the liquid crystal display device shown in FIG. 2 and the conventional liquid crystal display device.

The following description deals with results obtained by measuring respective luminance distributions of the present LCD and a conventional LCD. FIG. 6 is a graph showing the results.

Note that, the conventional LCD used for this measurement includes the normal white polycarbonate instead of the double-faced adhesive tape 3 and the reflection sheet 4 of the present LCD. In the conventional LCD, a common pear-skin texture pattern is applied onto the entire back surface 1b of the light guide body 1.

Note also that, in this measurement, the luminance was measured in a cross sectional surface obtained by dividing the two major sides of each LCD into two (in the present LCD, a cross sectional surface taken along line A-A' in FIG. 1).

In the graph, a horizontal axis indicated by "distance" shows a distance from the major side EL1 around which the fluorescent tube 5 is provided.

Moreover, a vertical axis indicated by "luminance relative value" is calculated based on the normalization in which the luminance at the center portion of the conventional LCD is taken as 100%.

According to the graph, in the conventional LCD, the bright line (high-luminance light) and the dark line (low-luminance light) are alternately emitted from the fluorescent tube vicinal part (distance: 0 mm to 10 mm) and from the gate opening adjacent part (distance: 70 mm to 80 mm).

Moreover, at the center portion (distance: 10 mm to 70 mm), the luminance decreases between the fluorescent tube vicinal part and the gate opening adjacent part. Thus, the luminance uniformity is not obtained.

On the other hand, in the present LCD, a gap of the luminance between any two of three parts, i.e., the fluorescent tube vicinal part, the center portion, and the gate opening adjacent part is little as compared with the conventional LCD, and the fluctuation in the luminance in each of the three parts is also small.

The present LCD excels especially in the luminance uniformity, as compared with the conventional LCD. This is clear because the flat part 28 (pear-skin texture pattern 29a) having the pear-skin texture boundary is provided in the fluorescent tube vicinal part on the back surface 1b of the light guide body 1, and because the wall surface 1c of the container section K is tilted.

Moreover, since the present LCD has such excellent luminance uniformity, it is possible to reduce the effect on the display quality even if the haze level of the diffusion sheet 7 is decreased. Therefore, since it is possible to increase the luminance by decreasing the haze level of the diffusion sheet 7, it is also possible to reduce luminescence quantity of the fluorescent tube 5, thereby reducing power consumption.

Concerning the sine wave shape of the boundary (pear-skin texture boundary) between the pear-skin texture pattern 29a and the flat part 28, concrete values of the amplitude, pitch, and average amplitude from the edge are shown in the above description. However, these values are not absolute.

Namely, it is preferable that the sine wave shape of the boundary be optimized according to the thickness of the light guide body 1 and/or the haze level of the diffusion sheet used on the light guide body 1.

Note that if the pitch of the pear-skin texture boundary is too wide, then each cycle of the high-luminance light and the low-luminance light becomes large. This causes cyclic luminance nonuniformity to be visible, which is not preferable. In contrast, if the pitch of the pear-skin texture boundary is narrow, there are no functional problems. However, it is technically difficult to form the pear-skin texture boundary at a considerably narrow pitch.

Figure 7:
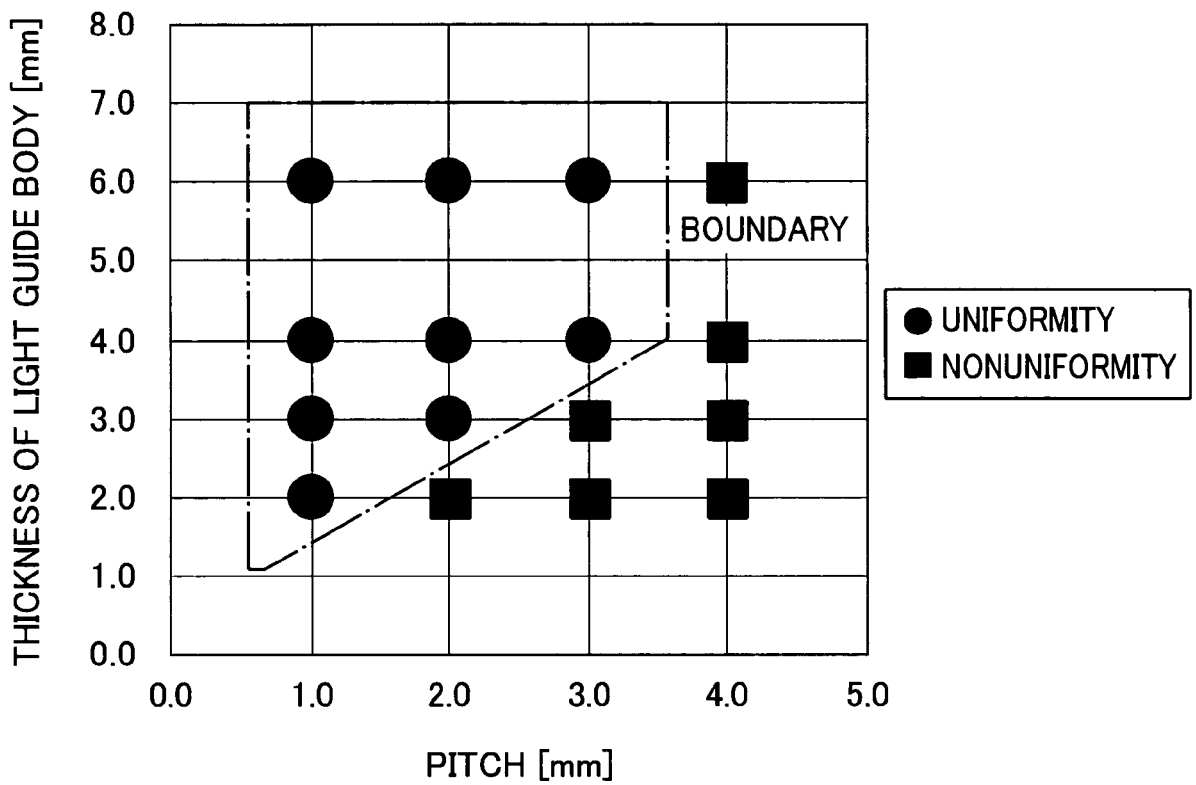
FIG. 7 is an explanatory diagram showing results obtained by measuring the presence or absence of the luminance nonuniformity while various changing thicknesses of the light guide body and pitches of a pear-skin texture boundary of the liquid crystal display device shown in FIG. 2.

FIG. 7 is an explanatory diagram showing results obtained by measuring the presence or absence of the luminance nonuniformity in the present LCD while variously changing the thickness of the light guide body 1 and the pitch of the pear-skin texture boundary.

As shown in FIG. 7, when the light guide body 1 becomes thicker, the luminance nonuniformity is difficult to occur even when the pitch of the pear-skin texture boundary becomes wider. On the contrary, when the light guide body 1 is thin, it is preferable to narrow the pitch of the pear-skin texture boundary.

In view of actual condition with regard to the light guide body 1, even if the light guide body 1 is prepared so as to become thicker than 7 mm, the luminance becomes saturated. No merit is brought about, accordingly. As such, it is preferable that the thickness of the light guide body be 7 mm or less.

Note that the limit of the thinness of the light guide body 1 depends on a diameter of the fluorescent tube 5 (linear light source). Even though tubes have been getting finer, the diameter of the linear light source is difficult to produce less than 1.4 mm (Φ1.4). As such, it is preferable that the diameter of the light guide body 1 be 1.5 mm or more.

In addition, because of a manufacturing problem, it is difficult for the pear-skin texture boundary to have a pitch (trick pitch) of not more than 0.5 mm. As such, it is preferable that the pitch of the pear-skin texture boundary be not less than 0.5 mm. Nonetheless, if such a manufacturing problem is solved, the pitch of the pear-skin texture boundary can be made smaller than 0.5 mm.

In addition, the pear-skin texture boundary does not have to have a constant cycle described above. That is, the pear-skin texture boundary may have a shape obtained by randomly connecting sine waves having various pitches of not more than a predetermined value, for example.

After the degree to which the present LCD is affected by the high-luminance line (bright line) and the low-luminance line (dark line) is observed, the amplitude of the pear-skin texture boundary is ultimately determined.

According to the observation of the present LCD, the light guide body 1 had a luminance change of at most about 5 mm. A good result was obtained by carrying out light shuffling with the use of the pear-skin texture boundary having amplitude of not more than half an affected distance (about 5 mm).

Moreover, at the pear-skin texture boundary, it is suitable to set the average amplitude (average line) from the edge of the light guide body 1 to about 1 mm in order to suppress reflection (flashing back) of the light entered directly from the fluorescent tube 5 toward the vicinity of the edge. Thus, when setting the average line to about 1 mm, and when effectively utilizing a flat part 28 having no pear-skin texture, it is possible for the light thus flashed back to be directed deeply into the light guide body 1, without scattering the light thus flashed back. As such, it is possible to increase the luminance at the center portion of the light guide body.

Moreover, in the present embodiment, as shown in FIG. 1, the pear-skin texture boundary, which is the boundary between the flat part 28 and the pear-skin texture pattern 29*a*, has the sine wave shape.

However, the shape of the pear-skin texture boundary is not limited to the sine wave shape, provided that the pear-skin texture boundary has a line shape (wave shape) which is a row of concavity and convexity and/or ups and downs.

That is, the shape of the pear-skin texture boundary is not limited to a specific one, provided that the flat small regions H which generate the high-luminance light and the pear-skin texture small regions N which generate the low-luminance light are alternatively provided in a direction to which the fluorescent tube 5 extends (see FIG. 5).

Figure 8:
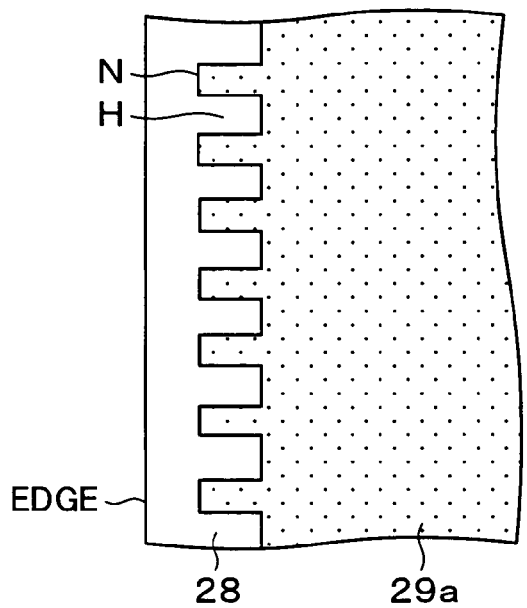
FIGS. 8($a$) to 8($d$) are explanatory diagrams respectively showing other types of pear-skin texture boundaries in the light guide body shown in FIG. 1.
Figure 8:
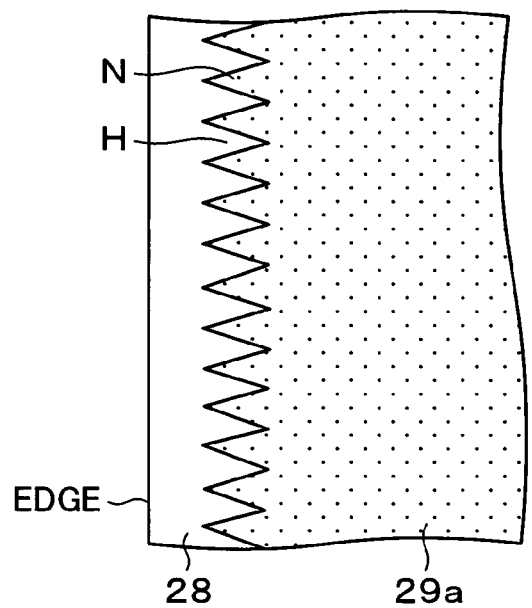
Figure 8:
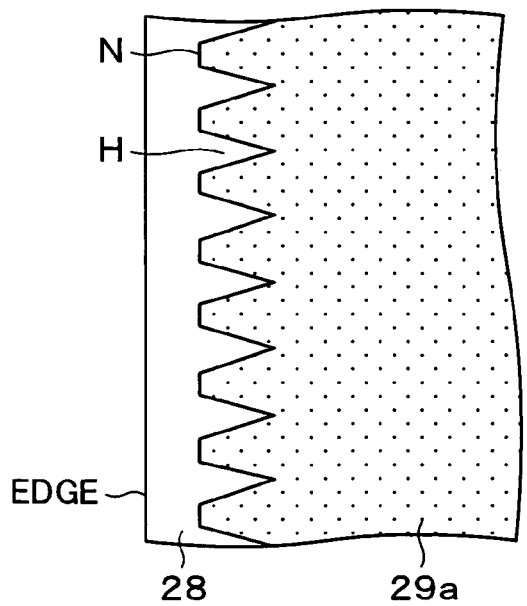
Figure 8:
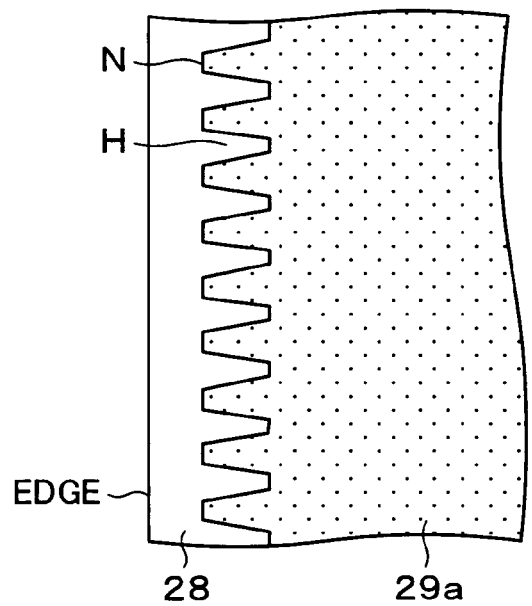
Figure 9:
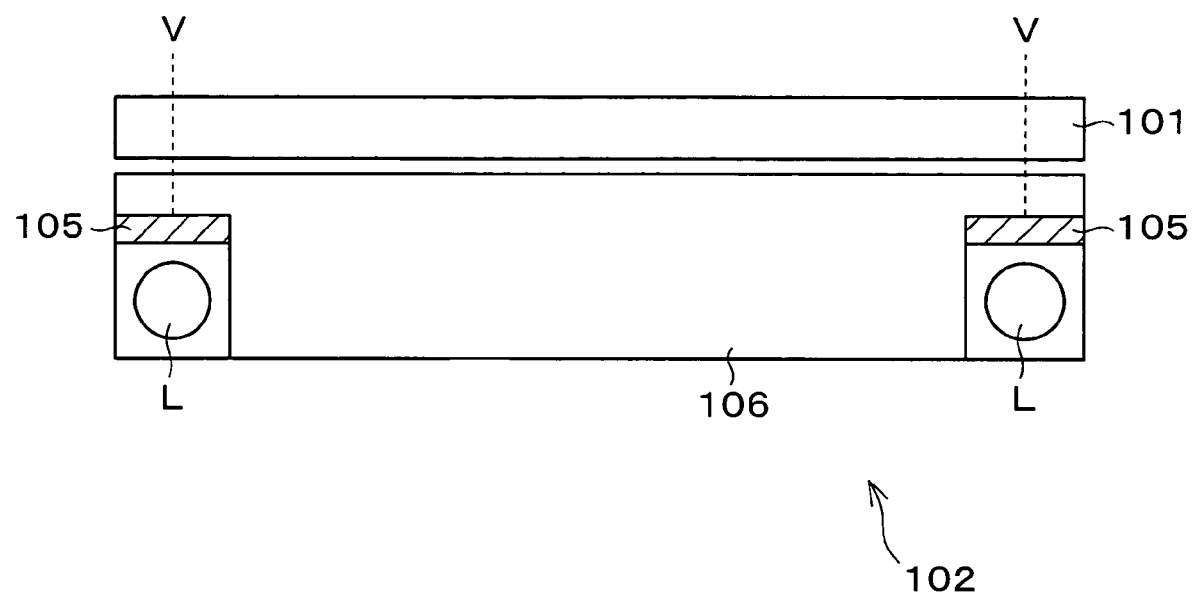
FIG. 9 is an explanatory diagram showing a structure of a conventional liquid crystal display device.

For example, as shown in FIG. 8(*a*), the pear-skin texture boundary between the flat part 28 and the pear-skin texture pattern 29*a* may have a rectangular wave shape (zebra shape). Alternatively, as shown in FIG. 8(*b*), the pear-skin texture boundary shape may have a triangular wave shape (a shape formed by a row of triangles; a sawtooth shape). In these cases, the flat small regions H and the pear-skin texture small regions N, which have a rectangular shape or a triangular shape, are alternately provided along the fluorescent tube 5 in the fluorescent tube vicinal part (or in the vicinity of the gate opening trace 27).

Alternatively, as shown in FIG. 8(*c*), the pear-skin texture boundary may be defined so that each of the flat small regions H has a tipping which has a triangular wave shape, and so that each of the pear-skin texture small regions N has a tipping which has a trapezoidal wave shape. Namely, the pear-skin texture boundary may be defined so that trapezoidal pear-skin texture small regions N and triangular flat small regions H are alternately provided.

Alternatively, as shown in FIG. 8(*d*), the pear-skin texture boundary may have a trapezoidal wave shape (a shape formed by a row of trapezoids).

Note that, as described above, the wave shape of the pear-skin texture boundary can be prepared by using a cutting machine for industrial design which is controlled by a computer.

By using this method, the pitch and/or the amplitude of the pear-skin texture boundary can also be variously designed according to a degree of the luminance nonuniformity occurred in the present LCD (especially, the luminance nonuniformity part in the vicinity of the fluorescent tube 5 (peripheral luminance nonuniformity)).

The present embodiment deals with the case where the wall surface 1*c* of the container section K tilts in the fluorescent tube vicinal part of the light guide body 1 in the present LCD. However, the present invention is not limited to this. For example, the present invention may include a structure in which only the main side EL1 of the light guide body 1 adopts such a tilting of the wall surface 1*c*.

For example, in some light guide bodies 1, the fluorescent tube 5 may be provided deeply in the container section K of the cutout 2, as far as the short sides ES are concerned. In this case, if the wall surface 1*c* tilts, then an area of the back surface 1*b* of the light guide body 1 becomes narrow. Therefore, as far as the short sides ES are concerned, the wall surface 1*c* may be perpendicularly provided in this case.

In the present embodiment, the double-faced adhesive tape 3 and the reflection sheet 4 are provided on the top surface of the cutout 2 in the light guide body 1 of the present LCD. However, the double-faced adhesive tape 3 and the reflection sheet 4 may be provided only along the major side EL1 of the light guide body 1, only along one minor side ES, or only along both minor sides ES (white polycarbonate may be provided along the sides where the double-faced adhesive tape 3 and the reflection sheet 4 are not provided).

Even with these arrangements, the double-faced adhesive tape 3 and the reflection sheet 4 are provided in cutout 2 along at least one side. As such, it is possible to improve the luminance uniformity as compared with the conventional LCD.

Moreover, the present embodiment includes the following features (a), (b), and (c).

(a) The flat part 28 and the pear-skin texture pattern 29*a* are formed in the fluorescent tube vicinal part on the back surface 1*b* of the light guide body 1. Further, the boundary (pear-skin texture boundary) extends so that the pear-skin texture small regions N and the flat small regions H are alternately provided in a direction to which the fluorescent tube 5 extends.

(b) The wall surface 1*c* of the container section K in the light guide body 1 tilts, and the wall surface 1*c* and the lower surface 2*b* of the cutout 2 contact with each other at the angle of (90°+β).

(c) The reflection sheet 4 is adhered to the upper surface of the cutout 2 via the double-faced adhesive tape 3 having the ultraviolet durability.

However, the present invention is not restricted to this. Namely, at least one of the above features (a), (b), or (c) are requisite for the present LCD. As long as the present LCD includes at least one of these features, it is possible to improve the display quality in the fluorescent tube vicinal part. More specifically, it is possible to suppress the luminance nonuniformity or the yellowing.

Moreover, in the present embodiment, the light guide body 1 is a rectangular flat plate (thin rectangular parallelepiped whose surface is a rectangle).

However, the shape of the light guide body 1 (the shape of the surface) is not limited to a rectangle. Alternatively, the shape may be other shapes such as an oval, a polygon, or the like. In these cases, the shape of the fluorescent tube 5 varies depending on the shape of the light guide body 1 so that the fluorescent tube 5 can be provided along the surface of the light guide body 1. Moreover, the flat part 28 (the pear-skin texture boundary) is provided along the surfaces of the light guide body 1, at the edge part, where the fluorescent tube 5 is provided, of the light guide body 1.

Moreover, in the present embodiment, the cutout 2 (container section K) is formed at the edge part (edge; side), where the fluorescent tube 5 is provided, of the light guide body 1. However, the present invention is not limited to this. Alternatively, the fluorescent tube 5 may be externally provided (outside the light guide body 1), without forming the cutout 2 in the light guide body 1. Even in this case, it is possible to improve the display quality in the fluorescent tube vicinal part because of the foregoing features (a) and (b).

Moreover, in the present embodiment, as shown in FIG. 3, the wall surface 1c of the container section K in the light guide body 1 contacts with the lower surface 2b of the cutout 2 at the edge part Q1 at the angle of $(90°+\beta)$ $(0<\beta)$.

However, the present invention is not restricted to this. Alternatively, the wall surface 1c and the lower surface 2b may contact with each other at an angle of less than 90°. Even with this arrangement, the main line direction of the light in the light guide body 1 is directed toward the back surface 1b. As such, it is possible to easily utilize the light which is directed toward the back surface 1b.

Alternatively, the wall surface 1c may contact with the lower surface 2b of the cutout 2 at the edge part Q1 at an angle of 90°. Even with this arrangement, it is possible to improve the display quality in the fluorescent tube vicinal part because of the foregoing feature (a).

Note that, in the case where the wall surface 1c and the lower surface 2b of the cutout 2 contact with each other at an angle of larger than 90° (alternatively, smaller than 90°), the following is true. Namely, the wall surface 1c and the surface 1a of the light guide body 1 contact with each other at an angle of smaller than 90° (alternatively, larger than 90°) when viewed from inside the light guide body 1.

Moreover, in the present embodiment, the light guide body 1 is made of acrylic. However, the present invention is not restricted to this. Alternatively, any transparent resin may be used as long as the light guide body 1 is formed by the injection molding.

Moreover, in the present embodiment, plural kinds of pear-skin texture patterns 29a through 29h, whose scattering intensities (light scattering abilities) are different from each other, are formed on the back surface 1b of the light guide body 1. However, the present invention is not limited to this. Alternatively, the pear-skin texture pattern formed on the back surface 1b may be a single kind of pattern. Even with this arrangement, it is possible to obtain the effect, which the flat part 28 and the wave-shaped pear-skin texture boundary formed in the fluorescent tube vicinal part, bring about.

Moreover, the pear-skin texture patterns 29a through 29h, inside the flat part 28 of the light guide body 1, can be formed when they are located more than 0.2 mm inner from the edge part of the light guide body 1 (preferably, about 1 mm to 3 mm inner from the edge).

Moreover, in the present embodiment, the present LCD is a liquid crystal display device which is used as an in-vehicle LCD for a car navigation system. However, the present invention is not limited to this. Alternatively, the present LCD may be used as a monitor LCD for a computer such as a laptop computer or desktop computer.

Moreover, the lighting section 10 of the present LCD can also be applied to electronic devices other than an LCD using a planar light source such as an interior illumination, a signboard, an X-ray device, or the like.

Note that, in the present embodiment, the flat part 28 is formed in the fluorescent tube vicinal part of the light guide body 1. However, the present invention is not limited to this, and the pear-skin texture pattern 29a may be formed up to the edge part of the light guide body 1. Note that, in this case, it is preferable that a large number of flat regions (flat small regions) having no pear-skin texture scatter about in the pear-skin texture pattern 29a along the fluorescent tube 5. Even with this arrangement, it is possible to suppress the increase of the luminance in the fluorescent tube vicinal part. Moreover, in this case, the forming of a flat region having no pear-skin texture, in addition to the above flat small regions, in a strap manner along the fluorescent tube 5 at the edge part of the light guide body 1 gives a desired effect.

Therefore, the light guide body of the present invention can be expressed as follows. That is, the light guide body of the present invention, including a side surface, a top surface, and a back surface, which causes a pear-skin texture region to scatter light incident on the side surface from a linear light source so that the light thus scattered is emitted from the top surface, wherein a flat region having no pear-skin texture is scattered about at an edge part of the back surface along the linear light source.

The light guide body of the present invention can also be expressed as follows. That is, the light guide body of the present invention, including a side surface, a top surface, and a back surface, which causes a pear-skin texture region to scatter light incident on the side surface from a linear light source so that the light thus scattered is emitted from the top surface, wherein the pear-skin texture regions and the flat regions having no pear-skin texture are alternately provided along the linear light source.

Moreover, the present invention can be suitably applied to devices, which use the planar light source, such as the liquid crystal display device, the interior illumination, the signboard, the X-ray device, or the like.

As described above, a first light guide body of the present invention is a light guide body, including a side surface, a top surface, and a back surface, which causes a pear skin texture region to scatter light incident on the side surface from a linear light source so that the light thus scattered is emitted from the top surface, wherein a flat region having no pear-skin texture is formed on an edge part of the back surface along the linear light source, the pear-skin texture region is formed inside the flat region, and a boundary between the flat region and the pear-skin texture region has a wave shape.

The first light guide body converts the light from the linear light source into planar light (light from a part having a predetermined width), and emits the light thus converted to the outside. The first light guide body can be suitably applied to electronic devices utilizing a lighting device which emits the planar light, such as a liquid crystal display device (LCD), an interior illumination, a signboard, an X-ray machine, or the like.

As mentioned above, the pear-skin texture region for scattering the light is formed on the back surface of the first light guide body. The light which is emitted from the linear light source and enters into the side surface is scattered by the pear-skin texture region on the back surface. The light thus scattered is emitted from the top surface facing the back surface.

Especially, the flat region having no pear-skin texture is formed on an edge part of the back surface along the linear light source.

That is, the quantity of the light incident on the back surface decreases gradually from a portion close to the linear light source toward a portion far from the linear light source. As such, the back surface of the edge part close to the linear light source receives extremely strong incident light (flash back light).

In view of the circumstances, the first light guide body includes the flat region at the above edge part, so that the light scattering quantity is suppressed and the luminance at the edge part is reduced.

Moreover, the pear-skin texture region is formed inside the flat region (an inner side of the flat region of the light guide body; on a side far from the linear light source) on the back surface of the first light guide body.

That is, in the first light guide body, the pear-skin texture fully scatters the incident light in the part (region) far from the linear light source. As such, it is possible to increase the quantity of the light which is emitted from the top surface. This allows the increase in the entire luminance.

Moreover, in the first light guide body, the flat region is formed along the linear light source. As such, the boundary (pear-skin texture boundary) between the flat region and the pear-skin texture region also extends along the linear light source.

Especially, in the first light guide body, the pear-skin texture boundary extending along the linear light source has a wave profile (wave shape). Here, the wave profile means a row of concavity and convexity or ups and downs, such as a sine wave shape, a triangular wave shape, a rectangular wave shape, or the like.

Therefore, in the first light guide body, it is possible to alternately provide, along the direction to which the linear light source extends, small pear-skin texture regions (pear-skin texture small regions) and small flat regions (flat small regions) via the pear-skin texture boundary.

With the arrangement, the high-luminance light (bright line) corresponding to the pear-skin texture small regions and the low-luminance light (dark line) corresponding to the flat small regions are alternately emitted, along the direction to which the linear light source extends, from the top surface above the pear-skin texture region in the first light guide body.

Therefore, when an optical film (light diffusion sheet or the like) having a function of shuffling of the light is provided on the top surface of the first light guide body, it is possible to emit the light having an intermediate luminance, which is brighter than the low-luminance line and darker than the high-luminance line, from the pear-skin texture boundary.

As described above, on the back surface of the first light guide body, the substantial scattering intensity on the pear-skin texture boundary can be set to be stronger than that on the flat region and weaker than that on the pear-skin texture region. That is, the scattering intensity of the back surface of the first light guide body is set so that it becomes stronger gradually from the edge part close to the linear light source toward the inside far from the linear light source.

Moreover, as described above, the quantity of the light incident on the back surface of the first light guide body decreases gradually from the edge part toward the inside.

Therefore, it is possible to uniformize the light scattering quantity on each region of the back surface of the first light guide body. This allows the luminance of the light, which is emitted from the top surface of the first light guide body, to be wholly unformized.

Note that, the pear-skin texture region inside the flat region is not limited to a specific one, provided that it is formed so that the boundary between the pear-skin texture region and the flat region has a wave profile. As such, in order to increase the luminance, it is preferable to form the pear-skin texture region on the entire surface inside the flat region. Moreover, another flat regions may be formed in part of the pear-skin texture region which is formed inside the flat region, to an extent that decrease of the luminance does not occur. That is, the pear-skin texture region may be formed on the substantially entire surface inside the flat region.

Moreover, in the case where the light (flash back light) incident on the edge part close to the light source is not so strong, it is preferable that the flat region be very small (narrow).

In this case, the scattering intensity at the edge part in the vicinity of the linear light source is substantially equal to the scattering intensity of the pear-skin texture boundary.

Moreover, it is possible to form the light guide body by the injection molding of transparent materials, such as acrylic or the like, with the use of the metallic mold. Here, a gate opening for pouring the transparent materials is usually formed in the metallic mold. Just after the injection molding, the light guide body has the projection corresponding to the gate opening.

The projection is removed after the light guide body is taken off from the metallic mold. A small trace (distortion), which is made during the removing of the projection, remains as the gate opening trace. The gate opening trace acts to enhance the scattering of the light.

In view of the circumstances, it is preferable that the flat region be formed also in the vicinity of the gate opening trace of the back surface of the light guide body. As a result, it is possible to avoid excessive light scattering caused by the gate opening trace.

Moreover, a second light guide body of the present invention, in which the light from the linear light source enters into the side surface, and is scattered by the pear-skin texture region formed on the back surface so as to be emitted from the top surface, is arranged so that the angle between the side surface into which the light from the linear light source enters and the top surface is not 90°.

As is the case with the first light guide body, the second light guide body also converts the light from the linear light source into the planar light so that the planar light is emitted the outside. The second light guide body can be suitably applied to electronic devices utilizing the planar light source, such as the liquid crystal display device, the interior illumination, the signboard, the X-ray machine, or the like.

Moreover, the pear-skin texture region for scattering the light is also formed on the back surface of the second light guide body. The light from the linear light source which enters into the side surface is scattered by the pear-skin texture region on the back surface, and the light thus scattered is emitted from the top surface which faces the back surface.

Especially, in the second light guide body, the side surface (incident side surface), which receives the light from the linear light source, tilts, and the angle between the side surface and the top surface is not 90°. Note that, this angle is an angle of a contact point between the incident side surface and the top surface. Such an angle was measured from inside the light guide body.

Generally, among directions in which the light travels from the linear light source to the incident lateral face, the main line direction (direction that the light quantity is the largest) in which the largest amount of light is directed is parallel to the top surface (back surface) of the light guide body.

In the case where the incident side surface is perpendicular to the back surface, the light traveling in the main line direction is not refracted by the incident side surface. This causes the main line direction of the light in the light guide body is also parallel to the top surface. As a result, since the light in the main line direction cannot act on (contact with) the top surface and on the back surface, it is difficult to use the light as the light emitted from the top surface.

On the other hand, in the second light guide body, the angle between the incident side surface and the top surface is not 90° (deviates from 90°). This causes the incident light from the linear light source to be directed in the main line direction, and is refracted by the incident side surface so as to be directed toward the top surface or toward the back surface of the light guide body.

Thus, in the second light guide body, since it is possible to reflect or scatter the light which is directed in the main line direction by the top surface or the back surface, it is easy to use the light as the light emitting outside. As such, it is possible to easily increase the entire luminance.

Moreover, in the case where the refraction angle is small, the light which is directed in the main line direction reaches a region which is away from the linear light source in the light guide body. As such, it is possible to improve the luminance uniformity of the entire surface of the second light guide body.

Moreover, in the second light guide body, it is preferable that the angle between the incident side surface and the top surface be smaller than 90°.

In this case, a lower edge of the incident side surface is located closer to the inner side than an upper edge of the incident side surface (i.e., the lower edge is farther from the linear light source than the upper edge). Therefore, in this case, when tilting the incident side surface, it is possible to avoid narrowing of the top surface from which the light emits.

Moreover, in this case, the cutout may be formed in the second light guide body by cutting out the edge part of the light guide body from the side of the back surface. In this arrangement, it is possible to arrange the container section, which stores the linear light source, on the side of the back surface of the cutout. In addition, the incident side surface in this arrangement is a side surface of the container section.

When storing the linear light source in such a container section, the linear light source is provided below the top surface. As such, while the size of the top surface, from which the light emits, is maintained, it is possible to reduce the size of a lighting device and an electronic device, which include the second light guide body.

Moreover, in the case where the cutout (container section) is formed, it is preferable to further provide a reflection sheet, on the upper surface of the cutout, for reflecting the light which goes into the cutout.

The reflection sheet is provided for avoiding the emitting of the light, which goes directly into the cutout from the linear light source, from the top surface. As a result, it is possible to avoid increasing of the luminance in the vicinity of the linear light source. This allows the luminance uniformity to be maintained.

Note that, in this arrangement, it is preferable that an edge part inside the reflection sheet be located sufficiently closer to the inner side than an edge part inside the lower surface in the cutout (i.e., the edge part inside the reflection sheet is farther from the linear light source than the edge part inside the lower surface in the cutout). The object of this arrangement is to cause the reflection sheet to surely reflect the light via, which is directed from the linear light source to the top surface, while grazing the edge part inside the lower surface in the cutout.

Part of the light, which is entered into the pear-skin texture region in the vicinity of the incident lateral face on the back surface, may be scattered (reflected) toward the incident side surface. Such light is reflected by the incident side surface toward the top surface in the vicinity of the incident side surface.

Therefore, when locating the edge part inside the reflection sheet so as to be closer to the inner side than the upper edge of the incident side surface (which is identical to the edge part inside the lower surface of the cutout), the reflection sheet can catch the light reflected by the incident side surface. Therefore, it is possible to avoid that this light causes the luminance of the edge part to increase.

Moreover, it is preferable that the reflection sheet be adhered to the upper surface of the cutout with the use of the double-faced adhesive tape including the ultraviolet absorbent.

Ultraviolet ray included in the light from the linear light source may change the reflection sheet into yellow. When the reflection sheet is changed into yellow, the color of the light emitted from the vicinity (the edge part of the second light guide) changes.

As described above, when adhering the reflection sheet to the upper surface of the cutout with the use of the double-faced adhesive tape including the ultraviolet absorbent (when sandwiching the double-faced adhesive tape between the cutout and the reflection sheet), it is possible to avoid the yellowing of the reflection sheet. As a result, it is possible to suppress the color change of the light emitted from the edge part.

Moreover, the present lighting device includes the first or second light guide body, the linear light source, and the optical film. Therefore, according to the present lighting device, it is possible to carry out the illumination of the planar light with high luminance and uniform luminance.

Moreover, by combining the present lighting device with the liquid crystal panel, it is possible to fabricate a liquid crystal display device whose display light has the good luminance uniformity.

Moreover, the present invention relates to a light guide body used in a liquid crystal display, and to a lighting. The present invention is applied especially to a narrow frame liquid crystal display. The light guide body of the present invention may be denominated a Torihara type light guide body. The function of the present invention relates to a field of the lighting. Recently, the user has needed especially the narrowing of the frame of the liquid crystal display. In view of the circumstances, the object of the present invention may be to meet the demands while maintaining high quality.

The technique disclosed in the document 1 made a breakthrough with regard to the narrowing of the frame of the liquid crystal display, thereby resulting in that the narrow frame liquid crystal display came into practical use. According to the structure disclosed in the document 1, in view of an optical arrangement in which the fluorescent tube is provided within the effective display region of the liquid crystal panel, an arrangement in which technical consideration for the luminance uniformity of the lighting is made to the fullest extent. As for the light guide body, a resin including light scattering agent is used for the cutout, and a transparent resin is used for the main light guide body. The luminance uniformity within the surface is secured, by combining the optimization of the density of the scattering agent of the resin including the light scattering agent with the haze level of the diffusion sheet mounted on the light guide body. In the light guide body, the pear-skin texture is formed on an entire surface on a side opposite to the surface for the lighting.

This light guide body uses the technique exclusive to the narrowing frame liquid crystal display. A typical light guide body having a flat plate shape has conventionally been used. In this light guide body, the pear-skin texture is formed on a surface on a side opposite to the surface for the lighting. There are two kinds of light guide bodies. In one of them, the pear-skin texture is formed on the entire surface of the opposite side. In the other one, a region having no pear-skin texture is provided on the surface of the opposite surface so as to have a predetermined distance from the fluorescent tube. Such conventional light guide bodies are generally and widely used. Under the circumstance in which the light guide bodies are used, the users further hope for the further reduction of narrower frame, higher luminance, lower change in chromaticity, and improvement of the display quality. An appropriate solution for the marketing needs and customer needs is given the status of importance. It is required to address and satisfy the customer needs of the narrowing of the frame in the liquid crystal display and the improvement of the display quality which are basically antithetical. To overcome these technical problems, the inventors reviewed and improved a proprietary light guide body, and could produce a light guide body which satisfied the user and marketing needs for the further reduction of narrower frame, higher luminance, lower change in chromaticity, and improvement of the display quality. The ultimate object of the present invention is to provide such a light guide body and a liquid crystal display device including the light guide body.

FIG. 2 may be a cross sectional view of a liquid crystal display in which the light guide body of the present invention, a lighting using the light guide body, and a liquid crystal panel having the lighting, are included. The light guide body is made of a transparent acrylic by the injection molding. During the injection molding, the pear-skin texture state pattern is transcribed to a surface (back surface) $1b$ opposite to the lighting side surface (front face) $1a$ of the light guide body. Moreover, the key component of the present invention is the light guide body, and the feature resides especially in the boundary shape of the pear-skin texture region on the back surface $1b$ of the light guide body and a geometric shape of the digging surface, for fixing the reflection sheet, of the cutout 2. The pear-skin texture pattern $29a$, which is in the vicinity of the fluorescent tube, is the lowest light scattering ability. The pear-skin texture pattern $29a$ suppresses an excessive use of the light from the fluorescent tube, and guides the light to the inside of the light guide body. In addition, the pear-skin texture patterns $29a$ to $29h$ may be arranged so that the deeper inside the light guide body is, the stronger the light scattering ability of the pear-skin texture becomes.

Moreover, a wave-shaped pear-skin texture boundary is formed on the periphery of the fluorescent tube. This is one of the features of the present invention, and the purpose of this wave shape is to suppress the regular repetition of the bright line and the dark line on the periphery of the display edge. This allows the improvement in the display quality of the liquid crystal display. Moreover, this wave shape corresponds to means for shuffling the bright line and the dark line so as to camouflage the regular repetition by chopping the bright line and the dark line, which are generated on the periphery of the display, in a depth direction and in a lateral direction at the same time. When using the lighting and the liquid crystal display in which the camouflaging caused the diffusion sheet and/or the prism sheet provided on the upper surface of the light guide body to carry out a further shuffling. It is possible to perform the display with fine proportioned luminance. The optimization of the wave shape depends on the thickness of the light guide body and/or the haze level of the diffusion sheet used on the light guide body. The amplitude, to be considered, of the wave shape may be determined by observing the degree to which the bright line and the dark line are affected on the liquid crystal display. In the light guide body of the present invention, in the case where the luminance change of substantially 5 mm is detected by observing the present LCD, it may be possible for the wave shape to aim the light shuffling with respect to half an affected distance. Moreover, it is appropriate that the average line from the light guide body be about 1 mm in order to suppress the flash back light of the fluorescent tube. By effectively utilizing a surface having no pear-skin texture, the flash back light can be guided deeply into the light guide body, so that the increase of the luminance at the center portion can be expected.

The metallic mold is sprayed with various kinds of sand blasts to form the pear-skin texture. In a manufacturing method of the pear-skin texture boundary line, it is preferable that a region, in which the pear-skin texture is not formed, be protected by a film having the wave shape. When the wave shape of the film is made by using the cutting machine for industrial design which is controlled by a computer, it is not necessary that the shape is limited to the wave shape, so that the film can be variously designed in accordance with the degree of the luminance nonuniformity on the periphery of the liquid crystal display. This gives rise to the increasing of the design. Such designing had been impossible up until now, so that the big progress and the fascinating aspect of the conception can actually function.

Moreover, in the case where a geometrical-optical consideration is made for the reflection sheet with respect to the digging (digging section D), on the upper surface of the cutout, for placing the reflection sheet, it is preferable to perform the geometrical-optical analysis in order to use the cross point of the cutout lower surface $1b$ for arranging the fluorescent tube and the edge surface for guiding the light from the fluorescent tube, when setting a limit numerical value. Moreover, in the equation (1), when it is assumed that d is 0.85 mm and np is 1.5, L1 becomes 0.45 mm when the substantial limit incident angle $\theta$ is 45°, whereas L1 becomes 0.60 when the actual limit incident angle $\theta$ is 60°. Because of this, it is possible to ultimately design L to be equal to L1 which is the digging limit value. As such, the ideal geometric condition satisfies L>L1. Actually, when L>0.4 mm is satisfied, it is possible to maintain generally good luminance uniformity. The value L changes depending on the change in the incident angles caused by the positioning of the fluorescent tube, depending on the thickness of the acrylic of the cutout, and/or depending on the refraction index of the transparent resin. As such, it is preferable that the designing of ideal L by using the general equation.

Moreover, the tilting of the edge surface (wall surface 1c) of the light guide body allows the main line of the light in the light guide body to be refracted by the edge face into which the light is entered and to be directed toward the upper surface of the light guide body, thereby resulting in that the light is guided deeply to the light guide body, and the luminance increases at the center portion and the uniformity of the entire luminance can be improved. In addition, the tilting of the edge surface (wall surface 1c) allows the scattering light in the vicinity of the edge surface of the light guide body to be internally reflected and to be surely scattered by the reflection sheet. Moreover, in the case where the double-faced adhesive tape using the acrylic pressure sensitive adhesive material is used for carrying out the fixing of the reflection sheet and the acrylic, the acrylic pressure sensitive adhesive material is exposed by ultraviolet rays emitted from the fluorescent tube. As such, it is preferable that the pressure sensitive adhesive having ultraviolet durability be applied to both sides of the double-faced adhesive tape.

Moreover, as shown in FIG. 6, by only applying the light guide body and the reflection sheet fixing method of the present invention to the conventional liquid crystal display, the present invention excels in the edge luminance profile, the luminance at the center portion, and the luminance profile in the vicinity of the gate opening. The marketing needs and customer needs can be satisfied by the light guide body of the present invention having novelty and non-obviousness. Furthermore, since the luminance distribution at the edge part is improved by the present invention, the decreasing of the haze level of the diffusion sheet used in the light guide body do not affect the display quality. As such, there is a possibility that the luminance is further improved. As a result, it is possible to provide a liquid crystal display which has strong competitive power on the market.

Moreover, the present invention may be expressed as the following third to fifth light guide bodies, a lighting system, a lighting jointing method, a lighting for display, and a liquid crystal display. That is, in the third light guide body, (i) the linear light source is provided so as to be parallel to the incident edge surface of the light guide body, (ii) the surface, on the side opposite to the lighting side, on which the pear-skin texture is formed includes the first region where the pear-skin texture is formed and the second region where no pear-skin texture is formed, and (iii) the boundary between the first and second regions has a wave shape. In this arrangement, by discontinuously dividing the strong flash back light of the fluorescent tube, it is possible to absorb the flash back light. Moreover, it is possible to guide the necessary light, without any loss, to inside the light guide body. Therefore, it is possible to attain higher luminance. Furthermore, since the injection molding of the light guide body can be done at one try as usual, it is possible to produce the light guide body at low cost without affecting the mass productivity.

Moreover, the fourth light guide body is a light guide body having a molded gate opening at an edge side. When the pear-skin texture, which is different from surrounding pear-skin texture, for suppressing the light scattering is formed on the surface, which corresponds to a surface which is subjected to a processing for cutting down a gate opening, opposite to the lighting side, the boundary between the region where the pear-skin texture is formed in the vicinity of the gate opening and the peripheral region where the pear-skin texture is formed has a wave shape. As a result, it is possible to blur the luminance nonuniformity in the vicinity of a gate opening caused by the light scattering by the gate cut-down potion and it is possible to improve the in-plane luminance distribution of the lighting and the liquid crystal display and to improve the display quality. Moreover, because the conventional pear-skin texture formation means can be used in the present invention, a new gate opening processing method is not necessary. Therefore, the burden for new equipment investment is not necessary, and the manufacturing cost is low.

Moreover, in the fifth light guide body, the linear light source is provided in the cutout of the light guide body having a cutout shape. The surface, on the side opposite to the lighting side, on which the pear-skin texture is formed, includes the first region where the pear-skin texture is formed and the second region where no pear-skin texture is formed, and the boundary between the first and second regions has a wave shape. With the arrangement, since the light scattering agent is moderately added to the cutout, a direct light from the fluorescent tube do not go through and reach the liquid crystal display. The luminance is moderately suppressed and the cutout contributes to the concinnity of the peripheral luminance. Moreover, by discontinuously dividing the strong flash back light in the vicinity of the fluorescent tube, it is possible to absorb the flash back light and to guide the light to inside the light guide body. As such, it is possible to attain higher luminance. Furthermore, since the injection molding of the light guide body can be done as usual, it is possible to keep high mass productivity. Therefore, it is possible to provide high quality products at low cost.

Moreover, according to the lighting system of the present invention, in the fifth light guide body, the reflection sheet is attached onto the upper surface of the cutout on the lighting side, the upper surface of the cutout is dug to specify a region where the reflection sheet is provided, and the edge of the reflection sheet, which is provided on the upper surface of the cutout, is located deeper in a display region direction of the display device than a cutout perpendicular line of the cutout light guide body. Therefore, it is possible to balance the narrowing of the frame and the reducing of the thickness at a high dimension. Moreover, since the in-plane luminance is attempted to be balanced by utilizing the light scattering effect of the reflection sheet itself, it is not necessary to include different kinds of resins in the cutout. Therefore, it is possible to inject at low cost. Moreover, since control points of the injection molding can be reduced, the productivity improves. Furthermore, since the reflection sheet is located deeper on the side of the display region than the cutout perpendicular line, no direct light from the fluorescent exists. As such, it is possible to improve the display quality.

Moreover, according to the lighting jointing method of the present invention, the ultraviolet absorbent is added to the double-faced adhesive tape which is used when the reflection sheet is fixed onto the light guide body of the above lighting system. Therefore, it is possible to suppress the yellowing of the double-faced adhesive tape and the deterioration of the adhesive strength, which are caused by the ultraviolet rays emitted from the fluorescent tube. It is also possible to realize an optical structure, which is stable over the long term. Therefore, it is possible to improve the durability and suppress the hourly change in chromaticity. As a result, it is possible to keep providing a good display quality over the long term.

Moreover, according to the lighting for the display of the present invention, one of the third to fifth light guide bodies is used. Therefore, it is possible to provide a lighting for the display in which the narrowing of the frame, higher luminance, lower chromaticity change, higher display quality, the decreasing of the thickness, higher mass productivity, and low cost are realized. Furthermore, according to the liquid crystal display of the present invention, the liquid crystal panel is mounted on the lighting in which one of the third to fifth light guide bodies is used. As a result, it is possible to realize and provide the liquid crystal display which has the narrow frame, high luminance, low chromaticity change, high display quality, decreased thickness, high mass productivity, and low cost, which have been demanded by the market and customers.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided that such variations do not exceed the scope of the patent claims set forth below.

What is claimed is:

1. A light guide body, including a side surface, a top surface, and a back surface, which causes a pear-skin texture region on the back surface to scatter light incident on the side surface from a linear light source so that the light thus scattered is emitted from the top surface,
   wherein a flat region having no pear-skin texture is formed on a surrounding edge part of the back surface along the linear light source,
   the pear-skin texture region is formed inside the flat region, and
   a boundary between the flat region and the pear-skin texture region has a wave shape.

2. The light guide body of claim 1, wherein the linear light source is U-shaped.

3. The light guide body as set forth in claim 1, wherein the flat region is formed in the vicinity of a trace of a gate opening used during an injection molding, on the back surface.

4. The light guide body as set forth in claim 1, wherein the boundary has any one of a sine wave shape, a triangular wave shape, or a rectangular wave shape.

5. The light guide body as set forth in claim 1, wherein:
   the pear-skin texture region has plural kinds of pear-skin texture patterns whose respective scattering intensities are different from each other, and
   scattering abilities of the pear-skin textures of the respective pear-skin texture patterns are set so that the farther from the linear light source the pear-skin texture patterns are located, the stronger the scattering abilities become.

6. A lighting device, comprising:
   a linear light source;
   a light guide body, including a side surface, a top surface, and a back surface, which causes a pear-skin texture region on the back surface to scatter light incident on the side surface from the linear light source so that the light thus scattered is emitted from the top surface, wherein a flat region having no pear-skin texture is formed on a surrounding edge part of the back surface along the linear light source, the pear-skin texture region is formed inside the flat region, and a boundary between the flat region and the pear-skin texture region has a wave shape; and
   an optical film provided above the top surface of the light guide body.

7. The lighting device of claim 6, wherein the linear light source is U-shaped.

8. A liquid crystal display device, comprising:
   a liquid crystal panel;
   a lighting device which illuminates light with respect to an effective display region of the liquid crystal panel, the lighting device comprising:
      a linear light source;
      a light guide body, including a side surface, a top surface, and a back surface, which causes a pear-skin texture region on the back surface to scatter light incident on the side surface from the linear light source so that the light thus scattered is emitted from the top surface, wherein a flat region having no pear-skin texture is formed on a surrounding edge part of the back surface along the linear light source, the pear-skin texture region is formed inside the flat region, and a boundary between the flat region and the pear-skin texture region has a wave shape; and
      an optical film provided above the top surface of the light guide body.

9. The liquid crystal display device of claim 8, wherein the linear light source is U-shaped.

10. An electronic device, comprising a lighting device which comprises:
    a linear light source;
    a light guide body, including a side surface, a top surface, and a back surface, which causes a pear-skin texture region on the back surface to scatter light incident on the side surface from the linear light source so that the light thus scattered is emitted from the top surface, wherein a flat region having no pear-skin texture is formed on a surrounding edge part of the back surface along the linear light source, the pear-skin texture region is formed inside the flat region, and a boundary between the flat region and the pear-skin texture region has a wave shape; and
    an optical film provided above the top surface of the light guide body.

11. The electronic device of claim 10, wherein the linear light source is U-shaped.

12. A method for manufacturing a light guide body, the light guide body, including a side surface, a top surface, and a back surface, which causes a pear-skin texture region on the back surface to scatter light incident on the side surface from a linear light source so that the light thus scattered is emitted from the top surface, wherein, a flat region having no pear-skin texture is formed on a surrounding edge part of the back surface along the linear light source, and a boundary between the flat region and the pear-skin texture region has a wave shape,
    said method comprising the step of carrying out an injection molding of acrylic by using a metallic mold so as to manufacture the light guide body,
    the metallic mold being prepared by a method comprising the steps of:
    (a) attaching, inside a basic metallic mold, a protective film having a shape of the flat region to a region where the flat region is formed;
    (b) spraying the inside of the basic metallic mold with various kinds of sand blasts corresponding to the pear-skin texture region; and
    (c) detaching the protective film.

13. The method of claim 12, wherein the linear light source is U-shaped.

* * * * *